May 24, 1966 H. C. SIBLEY ET AL 3,253,140
SYSTEM FOR DETECTING HOT ELEMENTS ON RAILWAY VEHICLES
Filed April 4, 1962 11 Sheets-Sheet 1

INVENTORS.
H.C. SIBLEY, R.B. HANER,
AND J.A. SNELL
BY
Forest B. Hitchcock
THEIR ATTORNEY

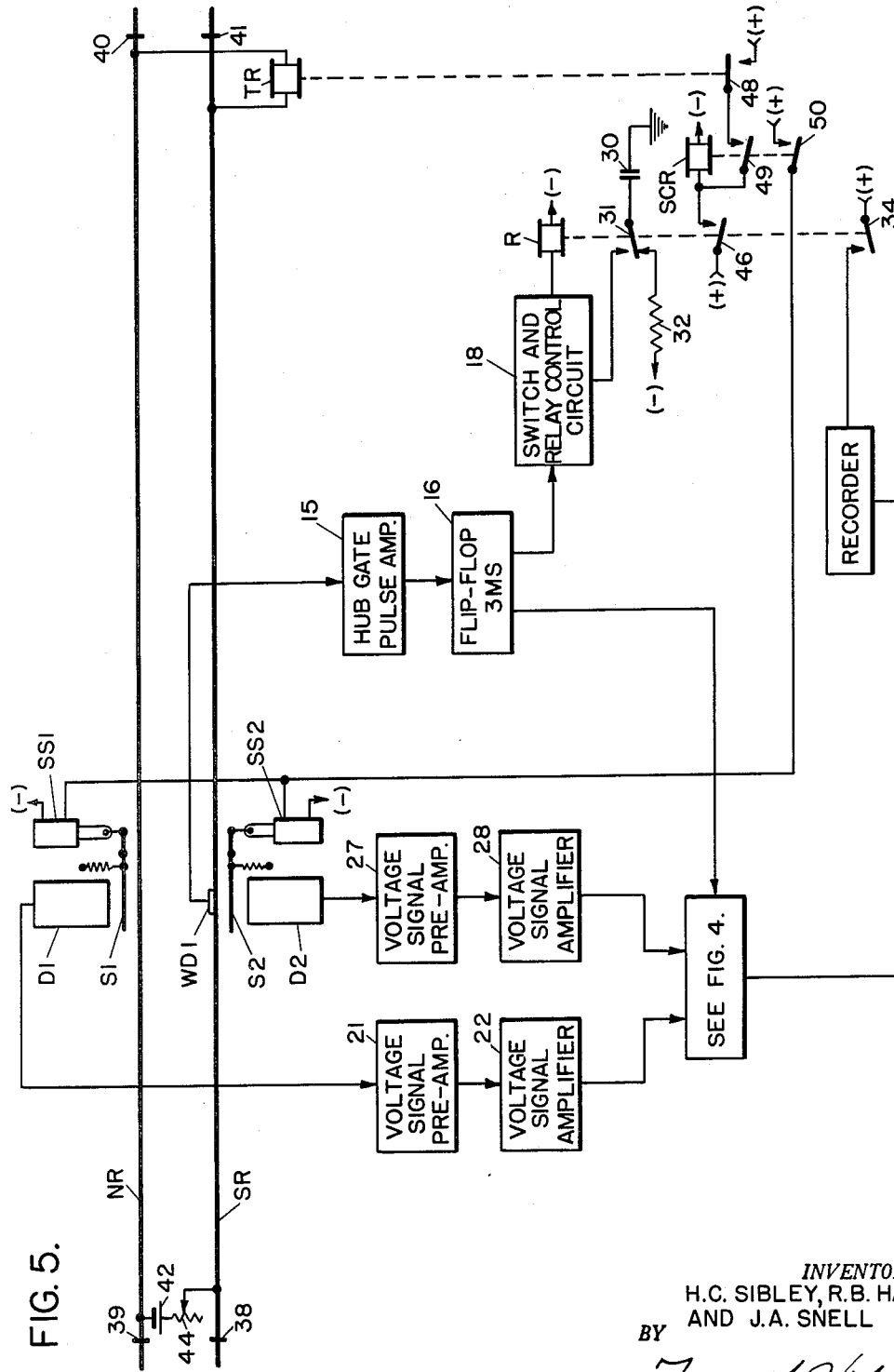

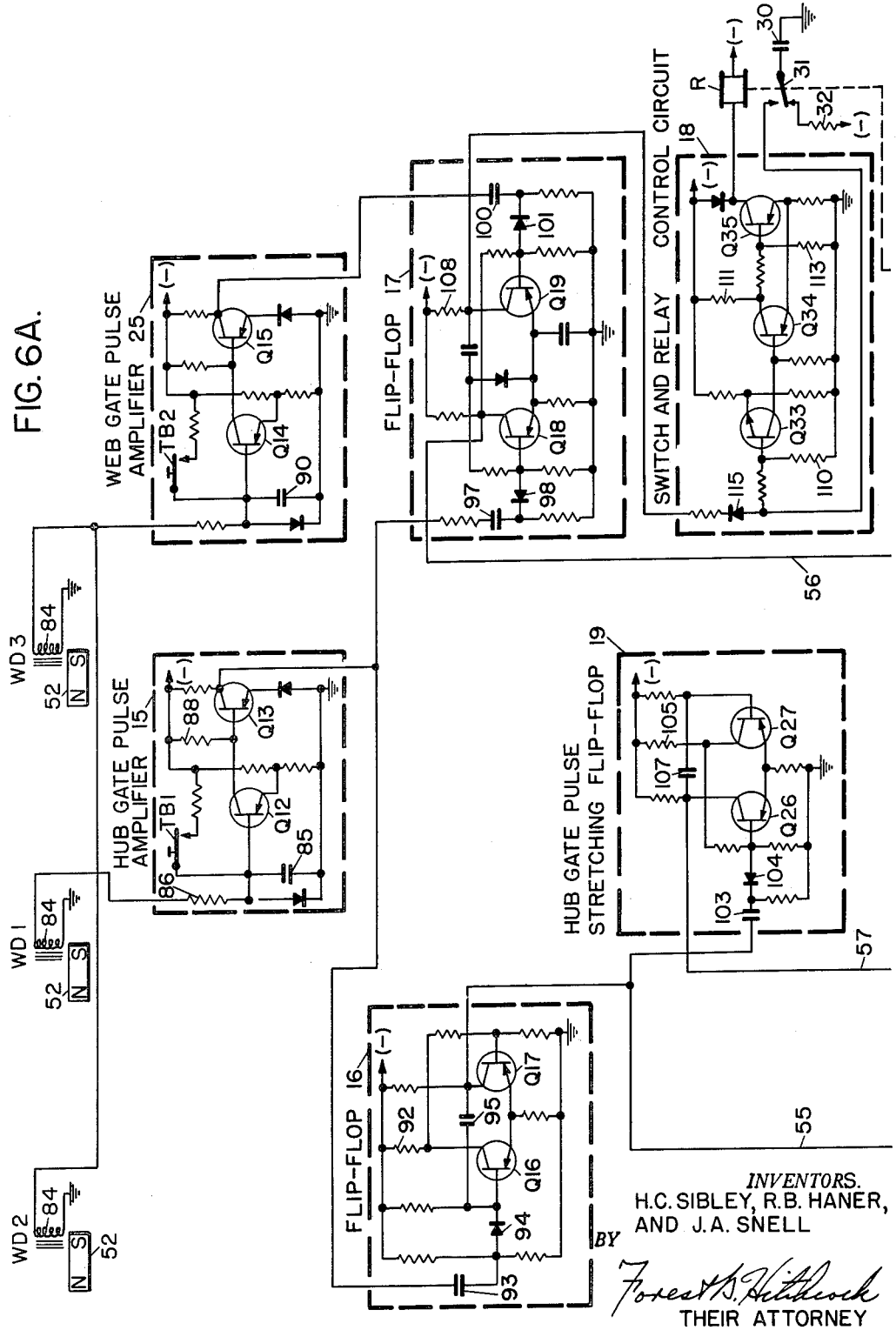

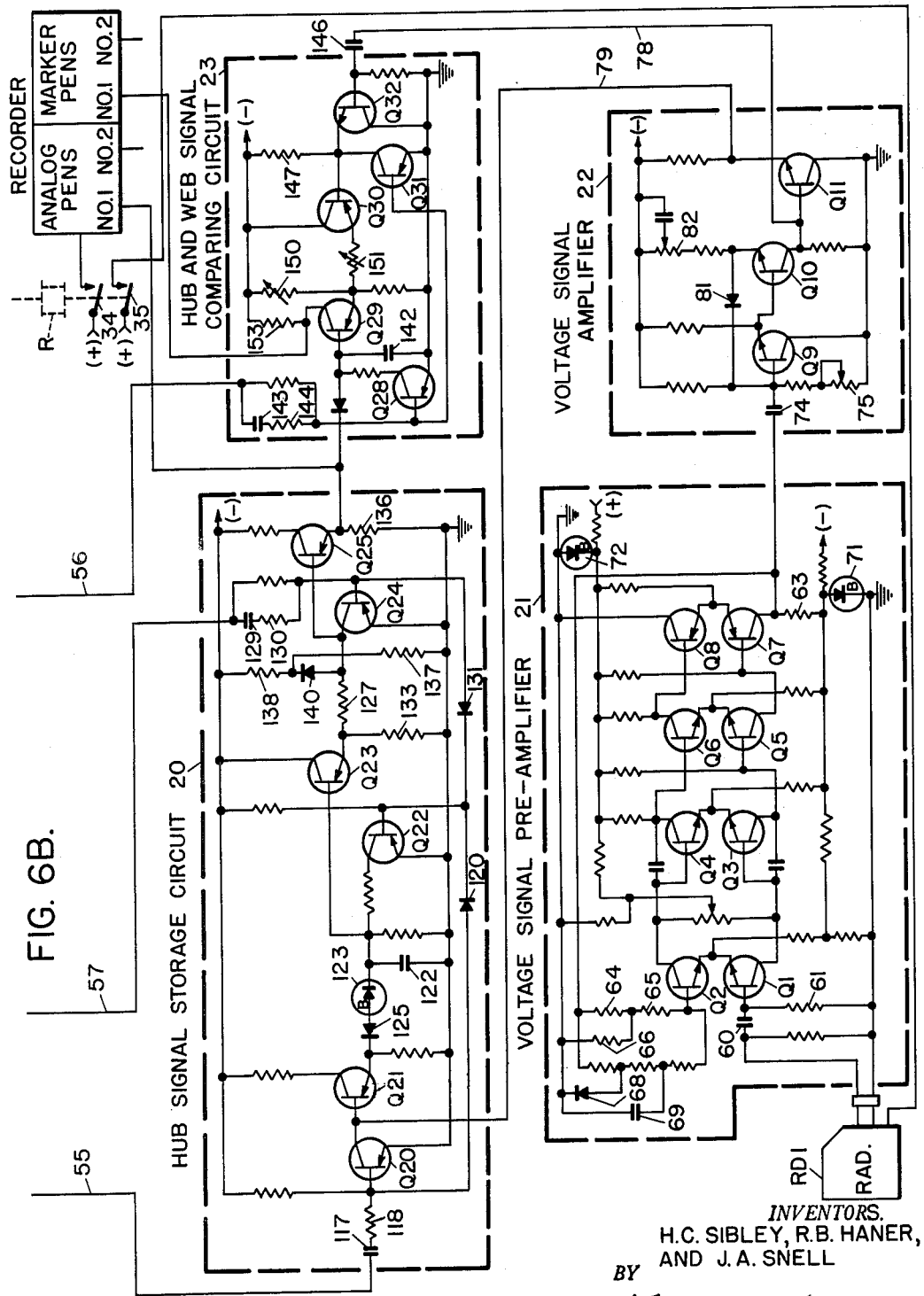

May 24, 1966   H. C. SIBLEY ET AL   3,253,140
SYSTEM FOR DETECTING HOT ELEMENTS ON RAILWAY VEHICLES
Filed April 4, 1962   11 Sheets-Sheet 6

FIG. 7.

TYPICAL TEMPERATURE CONDITIONS

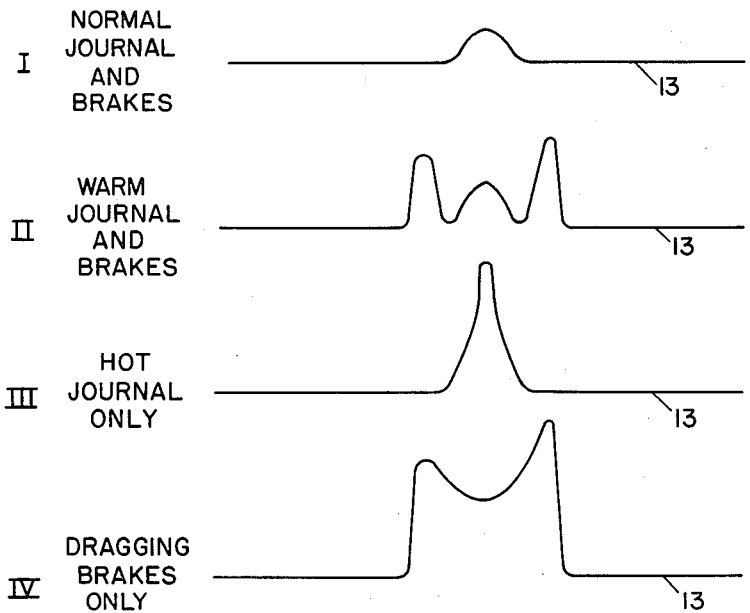

I — NORMAL JOURNAL AND BRAKES
II — WARM JOURNAL AND BRAKES
III — HOT JOURNAL ONLY
IV — DRAGGING BRAKES ONLY

FIG. 8.

TYPICAL TAPE PRESENTATIONS

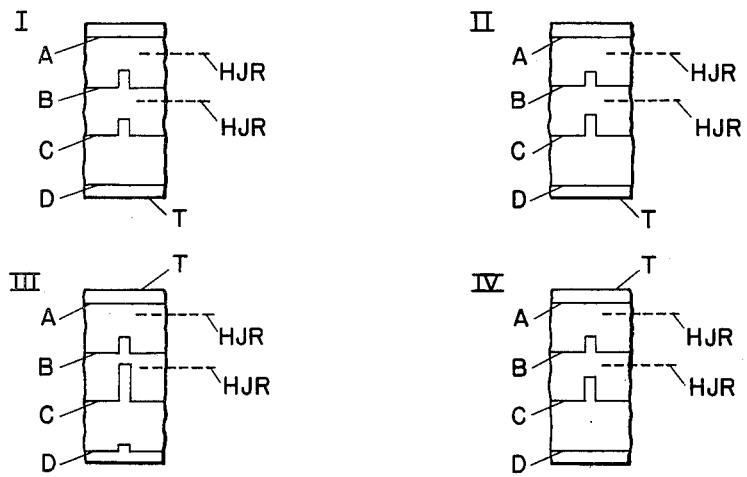

LEGEND:—
A = MARKER PEN NO. I TRACE
B = ANALOG PEN NO. I TRACE
C = ANALOG PEN NO. 2 TRACE
D = MARKER PEN NO. 2 TRACE
HJR = HOT JOURNAL RANGE

*INVENTORS.*
H.C. SIBLEY, R.B. HANER,
AND J.A. SNELL
BY
*Forest B. Hitchcock*
THEIR ATTORNEY May 24, 1966     H. C. SIBLEY ET AL     3,253,140
SYSTEM FOR DETECTING HOT ELEMENTS ON RAILWAY VEHICLES
Filed April 4, 1962     11 Sheets-Sheet 7

INVENTOR.
H.C. SIBLEY, R.B. HANER
AND J.A. SNELL
BY
*Forest B. Hitchcock*
THEIR ATTORNEY

INVENTOR.
H.C. SIBLEY, R.B. HANER
AND J.A. SNELL
BY

THEIR ATTORNEY

May 24, 1966  H. C. SIBLEY ET AL  3,253,140
SYSTEM FOR DETECTING HOT ELEMENTS ON RAILWAY VEHICLES
Filed April 4, 1962  11 Sheets-Sheet 10

INVENTOR.
H.C. SIBLEY, R.B. HANER
AND J.A. SNELL
BY
THEIR ATTORNEY

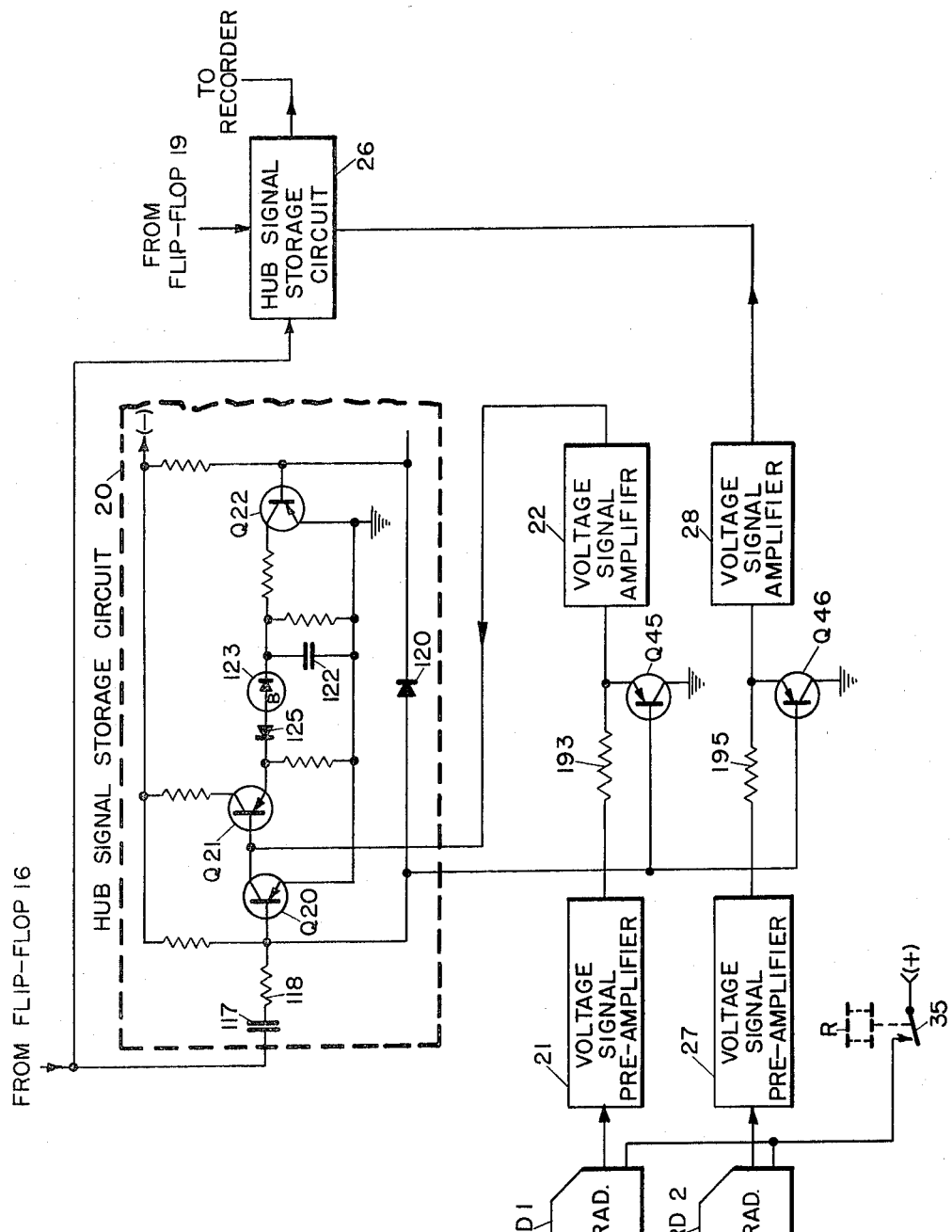

United States Patent Office 3,253,140
Patented May 24, 1966

3,253,140
SYSTEM FOR DETECTING HOT ELEMENTS ON RAILWAY VEHICLES
Henry C. Sibley, Spencerport, Robert B. Haner, Scottsville, and John A. Snell, Rochester, N.Y., assignors to General Signal Corporation, a corporation of New York
Filed Apr. 4, 1962, Ser. No. 186,597
16 Claims. (Cl. 246—169)

The present invention relates to a system for detecting hot elements on railway vehicles, and, more particularly, pertains to such a system for the detection of overheated journals where the resultant overheated condition thereof is identified as being caused by either the journal condition or associated dragging brakes with appropriate indications representative of such conditions being given.

This application is a continuation-in-part of our pending application, Serial No. 57,015, filed on September 19, 1960.

One major problem confronting the American railroads which has been persistently present over a number of years is the problem of reducing the number of times that overheated bearings of railway cars go undetected. Many undetected overheated bearings have been the cause of respective accidents resulting in extensive damage to trains and their loadings. A high standard of inspection and maintenance has been maintained, but such damages resulting from overheated bearings have not been reduced to a satisfactory level thus making it imperative to resort to another means for detecting an incipient overheated bearing condition and providing a warning thereof in order to arrest such incipient condition before it becomes dangerous.

In considering the problem of detecting overheated journals, various expedients have been devised in an attempt to solve this problem. In recent years, these attempts have taken the form of providing a radiation detection device, i.e., a bolometer, thermocouple, or radiometer, positioned along the trackway for sensing with a detector cell infrared radiation emanating from different areas affected by infrared energy originating from the journal and then giving the appropriate warning, either audible or visible, to indicate the presence of an overheated journal. These different areas include the journal boxes, the axles and the wheel hubs, both with respect to the inside and outside thereof. In each instance, it has not been possible at all times for these areas to provide infrared radiation which is truly representative of the journal temperature, but have at times either provided infrared radiation characteristic of a temperature too low to indicate the true journal temperature or infrared radiation characteristic of a temperature too high as compared to the true journal temperature. In many such instances, a false representation of journal temperature is provided which could result in unnecessary stoppage of trains.

It has been observed that solar energy or other spurious sources having high infrared radiation levels may impinge upon a detector cell for a limited time interval without permanently damaging such cell or causing it to lose its sensitivity. A problem ensuing, however, has been to provide accompanying amplification circuits which can accurately respond to successive cell output pulses of highly variable amplitudes and provide amplified outputs commencing from the same starting or reference potential.

To overcome this problem, different attempts have been made to direct the beam of scan so as to shield the detector cell from solar energy when not looking at journal boxes or axles. The general practice is to scan the journal boxes or axles and further include in the beam of scan the undersides of railroad cars and ends of cars to provide an ambient temperature reference level. Moreover, according to radiation detection device positioning, a shutter is actuated from a shielding position to permit scanning by employing a positioned wheel detector device responsive to each wheel passing thereby which causes the shutter to remain open for only a very limited time, but to resume its shielding position between cars.

In the present invention, it is contemplated to provide a radiation detection device or radiometer positioned alongside the track rail so as to have its beam of scan directed to include the infrared radiation level of each wheel hub and to also include the infrared radiation level of each wheel web. In one instance, the beam of scan also includes the coupler connection between cars which acts to provide an ambient temperature reference level and thus shields the detector cell from solar energy. In another instance, the beam of scan is directed to include each wheel hub and each wheel web, but is further exposed to solar energy between passing railroad cars only as limited by an included shutter operating delay circuit.

The present invention further provides a novel preamplifier so organized that it recognizes a high amplitude pulse supplied from the radiation detection device, amplifies such pulse, and then stabilizes itself immediately through the medium of a feedback circuit in order that it will recognize successive pulses of less amplitude immediately supplied to it which may be representative of a journal having either a normal or abnormal temperature. This novel pre-amplifier combined with the above-mentioned shutter operating delay circuit limits the need of providing a continuous background for the beam of scan when not scanning wheels to provide an ambient temperature reference level or causing the successive opening and closing of a shutter mechanism as railroad cars pass the radiation detection device location.

Some of the different areas from which infrared energy emanates are also influenced by outside infrared energy sources which increase respective temperatures, while others are so far removed from the journal that insufficient heat radiation from the journal is imparted thereto. In this connection, the axles as well as the inside wheel hubs are sufficiently removed from the journal location such that insufficient heat radiation is imparted thereto to provide a representative indication of journal temperature. By contrast, the journal box and the outside wheel hub, being in close proximity to the journal, receive heat radiation particularly characteristic of the temperature of a journal. The journal box is, however, exposed to solar energy at times which tends to increase its temperature to an appreciable degree above the journal temperature to thus provide a temperature which is not characteristic of the associated journal, while the outside hub, being sheltered as it is from solar energy, receives heat radiation from the rim of its wheel through the web thereof according to the amount of braking or dragging brakes.

Another condition often occurring which sometimes results in unnecessary damage is the condition where brakes are inadvertently dragging or locked. The inadvertent dragging or locking of brakes may result due to failure of the braking system even though the trainman has properly released the brakes on the train. In this connection, the brake shoe for a single wheel or up to all of the brake shoes for respective wheels on a particular train may be dragging or locked in position. Also, improper release of the brakes could result in rotation of particular wheels at a reduced speed, i.e., a partial braking is in effect. An effect similar to the partly released brakes could be realized for all wheels on a train where the train is operating in a territory having many small curves and hills. This type of terrain normally requires that the trainman provide an almost constant braking to suitably operate the train therethrough where the speed limit is comparable to that for other more level terrains.

From the foregoing discussion, it is obvious that a condition could exist where the rim temperature exceeds the hub temperature for one or more wheels on railway cars, but yet the hub temperature is at an infrared radiation level which is representative of a hot journal condition. For such temperature condition, it would not be enough for a system to consider only the hub and rim temperatures to determine which is at a higher infrared radiation level in order to provide positive indications of the journal and brake temperature conditions for each wheel of a train, but the influence of rim temperatures upon journal temperatures must be taken into consideration for providing a correct interpretation of the existing journal temperature.

In the present invention, a system for the detection of journal temperatures is proposed where the infrared energy emanating from the outside hub of each passing wheel of a train acts on a heat radiation detection means suitably positioned along the trackway, while the infrared energy emanating from the web of each wheel also acts on that heat radiation detection means to thereby provide contrasting outputs which may be compared electronically for identifying the causation of journal temperature conditions, i.e., either substantially due to a hot journal condition or attributable to a dragging brake condition. In this connection, the portion of the web for each wheel from which radiometer outputs representing temperature reading are employed is, under normal conditions, essentially the least affected by either the hub or rim temperatures. It follows that this portion would thus be the lowest temperatured area between the hub and rim of a wheel for normal temperature conditions.

In order to make use of radiometer outputs representing hub and web temperatures respectively for each wheel, it is obvious that some means must be employed to detect the presence of a wheel in the vicinity of the radiation detection device for insuring that such outputs employed are representative of the particular hub and web areas desired. To accomplish this, a novel gating organization is proposed in the present invention which employs a plurality of track instruments disposed adjacent the rails in the vicinity of such radiation detection device. Each of the track instruments is effective to provide an output when a wheel passes in the presence thereof for further controlling other electronic circuits included with the gating means in order to appropriately select outputs supplied from the radiation detection means representative of hub and web temperatures which may be compared as to their relative amplitudes.

The positioning of the radiometer along the track side so as to direct its beam of scan to include both the wheel hub and wheel web permits at least two forms of gating to be effective for utilizing the radiometer outputs representing hub and web temperatures. In this respect, it is only necessary to have those outputs representing hub and web temperatures compared by electronic circuits where the usable outputs are limited by the positioning of the above-mentioned plurality of track instruments.

In one form of this invention, the electronic circuits are controlled by outputs from the plurality of track instruments to permit utilizing each radiometer output representing the temperature of a selected portion of the hub for a passing wheel which is stored and then compared with radiometer outputs representing temperatures of a selected web portion only as limited by the spaced positioning of two track instruments. Comparison of the radiometer outputs representing temperatures of a hub and web of a wheel determines that output having the greater amplitude for thereafter operating a recorder and providing indications as to the temperature conditions of a journal and associated brakes.

A second form of this invention includes electronic circuits controlled by outputs from the plurality of track instruments to permit utilizing each radiometer output obtained during a predetermined interval of time and representing the temperature of a selected portion of the hub for a passing wheel which is stored and then compared with a radiometer output obtained during a similar predetermined interval of time and representing the temperature of a selected portion of the web for that passing wheel. Comparison of the radiometer outputs representing temperatures of a hub and web of a wheel determines that output having the greater amplitude for thereafter operating a recorder and providing indications of the journal and associated brakes for each wheel.

Certain advantages result from employing and comparing radiometer outputs representing temperatures of wheel hubs and webs which otherwise are not attainable with the systems of the prior art. One distinct advantage of this invention is the ability to provide a highly accurate indication of the journal temperature for each wheel of a train irrespective of influencing outside infrared energy sources. Another distinct advantage is attained in that only one infrared radiation detection device is employed adjacent each rail for both directions of train travel. The gating circuit organization referred to above is so organized that it is responsive to a train traveling in either direction for scanning the hub of a wheel and a portion of the web following hub scanning according to the direction in which the train is traveling. Another distinct advantage is herein attained in that the positioning of the radiometer may be such as to include in its beam of scan solar energy for a limited time as may be present between passing railroad cars which is ineffective to disrupt accurate system operation.

In view of the above, one object of this invention is to provide a detection system employing a radiometer unit which scans both the hubs and webs of passing wheels to thereby provide true indications, not only of overheated journals, but also of dragging brakes.

Another object of this invention is to provide a detection system employing a radiometer unit whose beam of scan is directed to include both the hubs and webs of passing wheels and yet be exposed to solar energy which may appear between successive cars which is ineffective to disrupt accurate system operation.

Another object of this invention is to provide a detection system employing a radiometer unit which scans both the hubs and webs of passing wheels and employs a gating circuit organization which is effective to provide separate distinctive signals for overheated journals and dragging brakes.

Another object of this invention is to provide a detection system for separately detecting overheated journals and dragging brakes of railway cars which employs a gating circuit organization effective to distinguish between the different signals received respectively from wheel hubs and wheel webs for either direction of train movement.

Another object of this invention is to provide a detection system for overheated journals of railway vehicles employing a protective shutter mechanism for the infrared detecting element which is automatically operated in a predetermined time following train passage or train stoppage to close the shutter.

Another object of this invention is to provide a preamplifier usable with a radiometer unit which is effective to respond to successive radiometer outputs having highly variable amplitudes and provide amplified versions thereof where all amplified outputs are maintained at the same starting or reference potential.

Other objects, purposes and characteristic features of this invention will be in part obvious from the accompanying drawings and in part pointed out as the description of the invention progresses.

In describing the invention in detail, reference will be made to the accompanying drawings in which like reference characters designate corresponding part throughout the several views, and in which:

FIG. 5 illustrates a shutter control circuit for the shutters of the radiometers;

Figure 9:
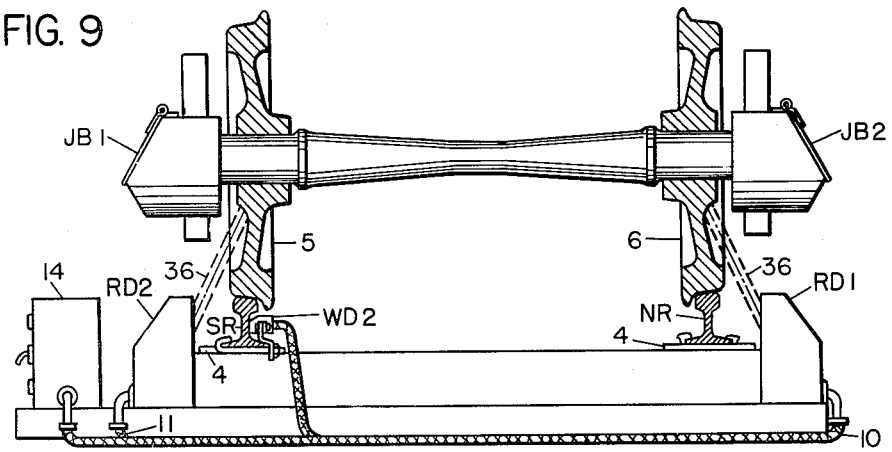
Figure 12B:
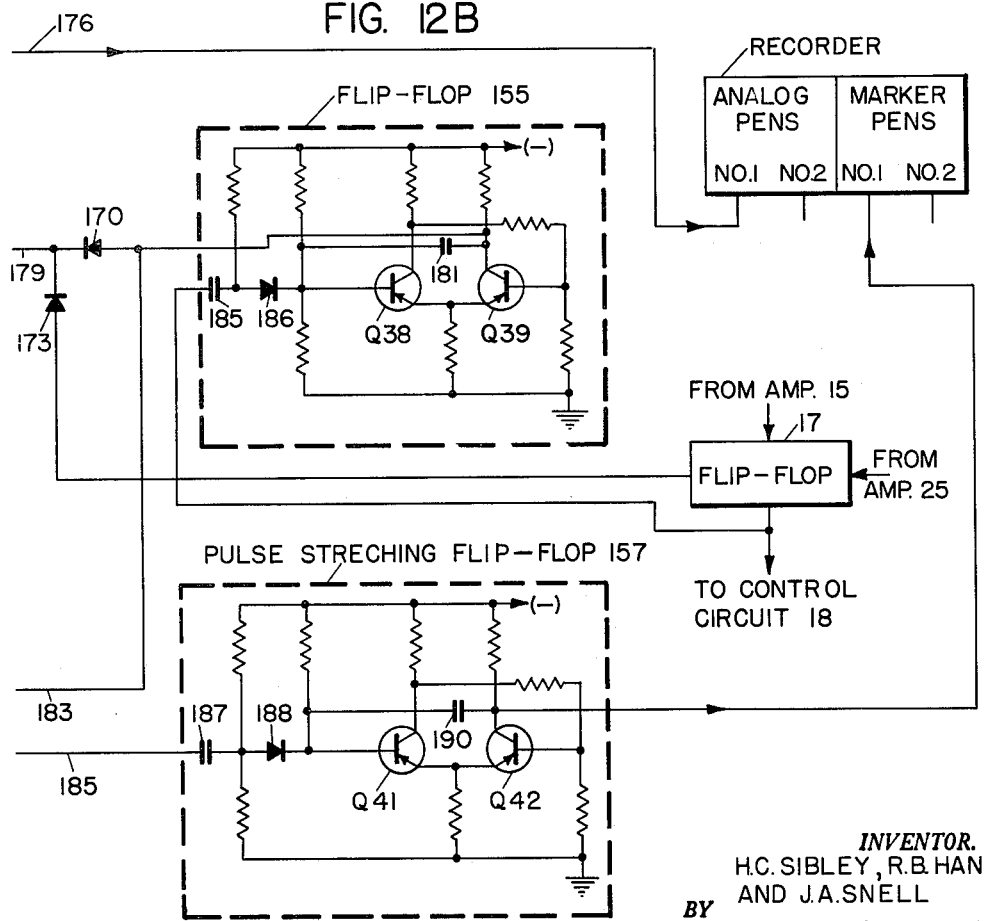
Figure 10:
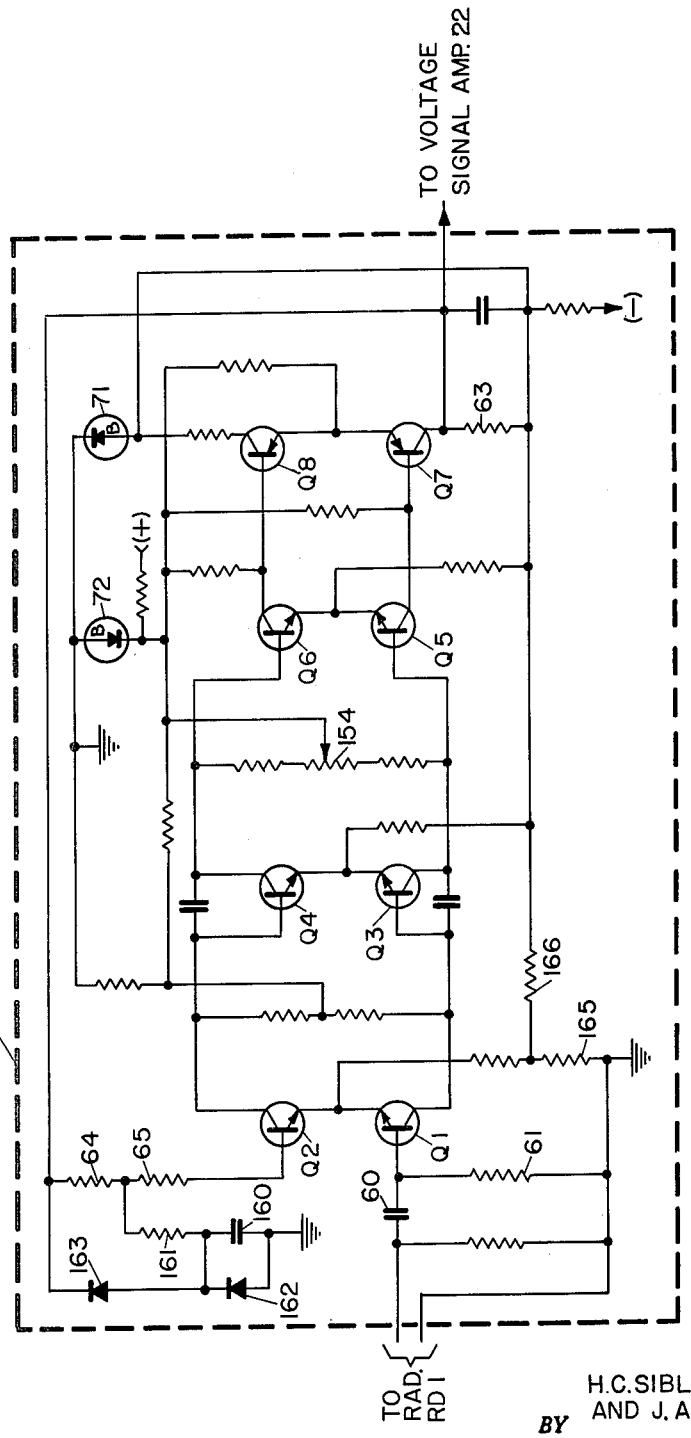
Figure 11:
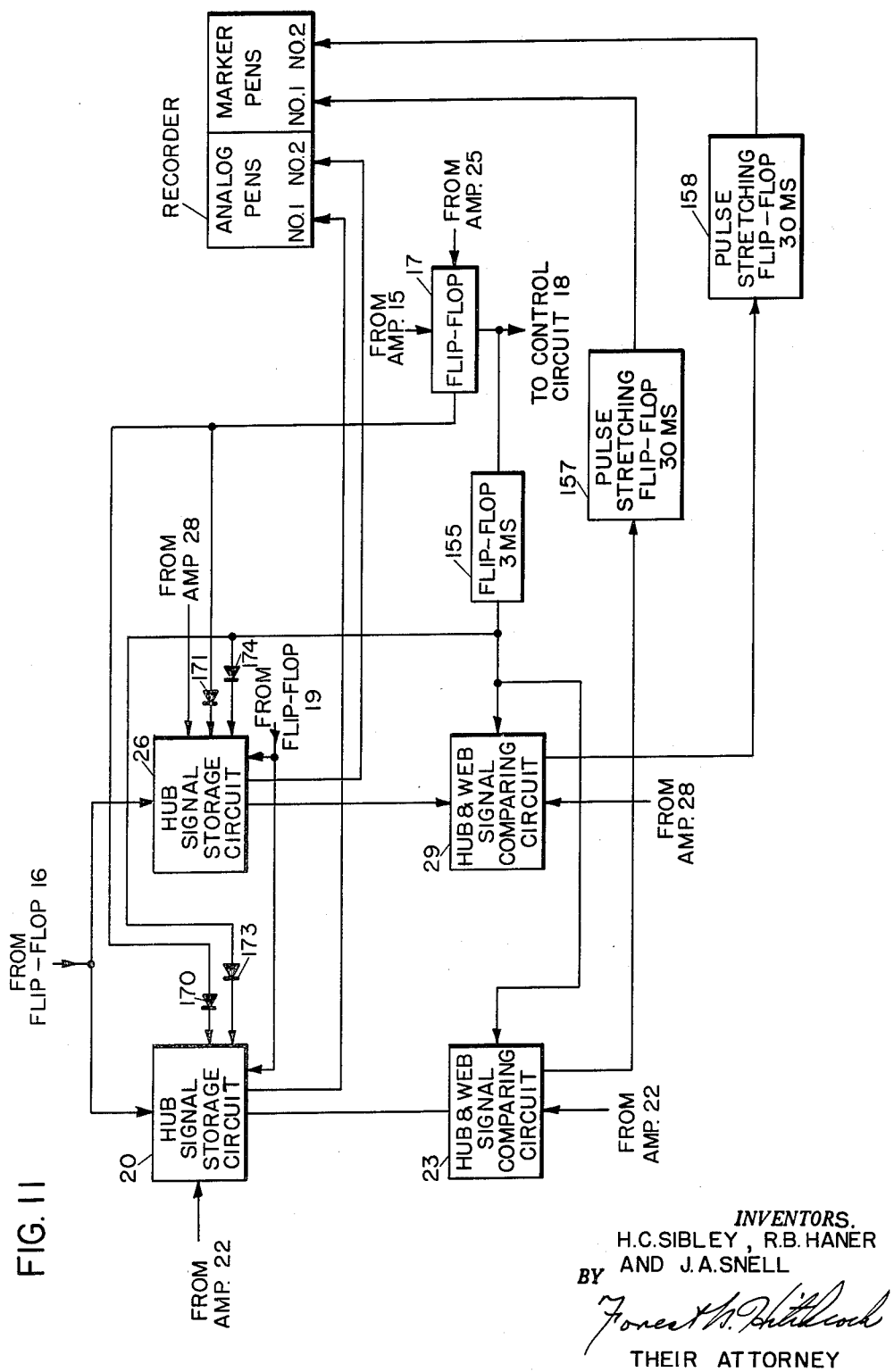
Figure 12:
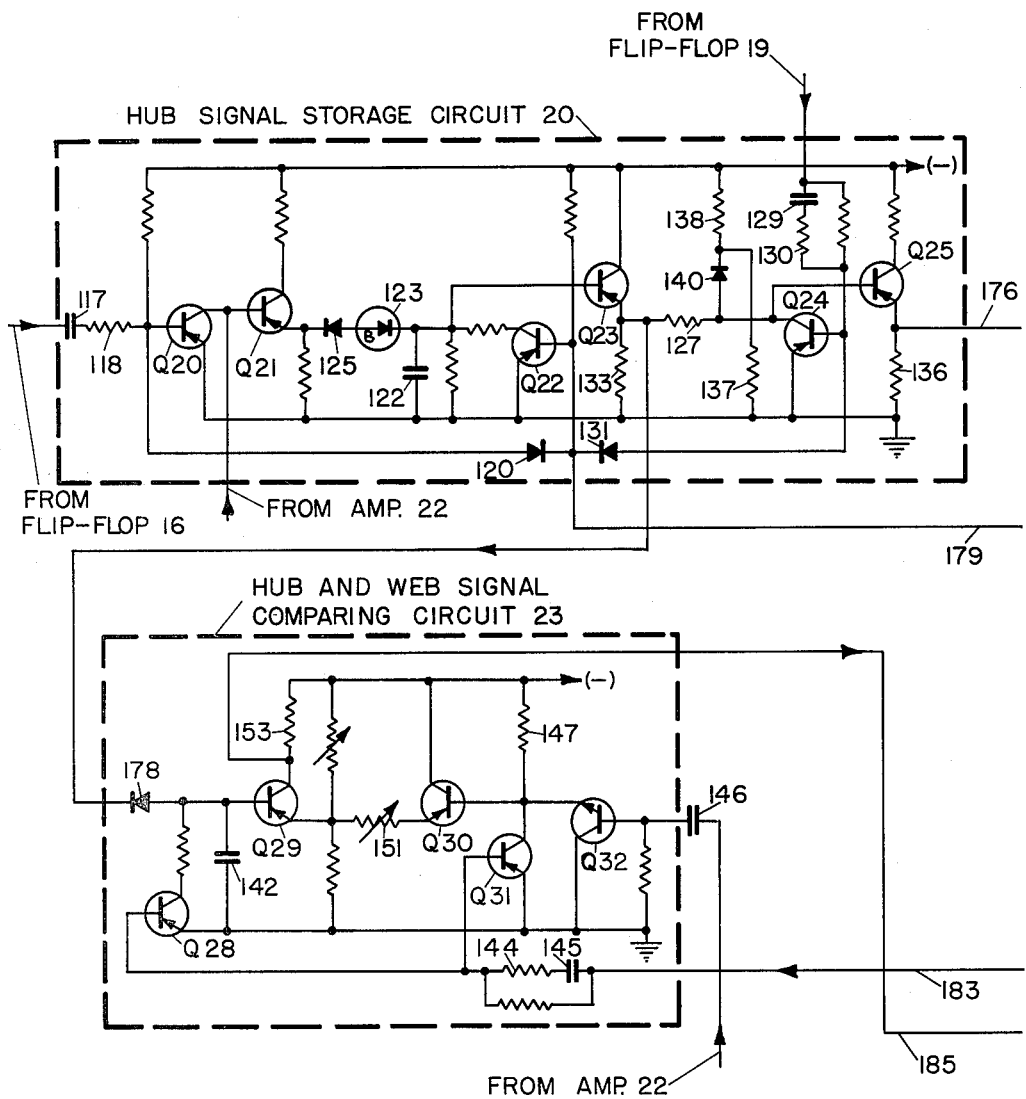

FIGS. 6A and 6B when arranged with FIG. 6A above FIG. 6B illustrate in a detailed manner the circuit organization of this invention;

FIG. 7 shows typical waveforms illustrative of typical combinations of temperature conditions for journals and associated brakes;

FIG. 8 shows typical tape presentations representative of the respective temperature conditions illustrative of the waveforms shown in FIG. 7;

FIG. 9 is an elevational view again showing the positioning of radiometers in respect to the wheels of a passing train where the beam of scan is directed to permit exposure of the detector cell to solar energy;

FIG. 10 is a detailed circuit diagrammatically illustrating a modified pre-amplifier circuit for a radiometer unit;

FIG. 11 is a block diagram of a modified form of this invention;

FIGS. 12A and 12B when arranged with FIG. 12B respectively to the right of FIG. 12A diagrammatically illustrate in a detailed manner the circuit organization of the modified form of this invention shown in FIG. 11; and FIG. 13 illustrates by block diagram and detailed circuitry still another form of this invention.

To simplify the illustrations and facilitate in the explanation, the various parts and circuits constituting the embodiments of the invention have been shown diagrammatically and certain conventional illustrations have been employed. The drawings have been made to make it easy to understand the principles and mode of operation rather than to illustrate the specific construction and arrangement of parts that might be used in practice. The various relays and their contacts are illustrated in a conventional manner and symbols are used to indicate connections to the terminals of batteries or other sources of electric current instead of showing all of the wiring connections to such terminals. Thus, the symbols (+) and (−) indicate connections to the opposite terminals of a source of relatively low voltage suitable for the operation of various relays and the transistor circuits and a symbol for a ground connection indicates a connection to a voltage terminal intermediate between that of the (+) and (−).

Figure 1:
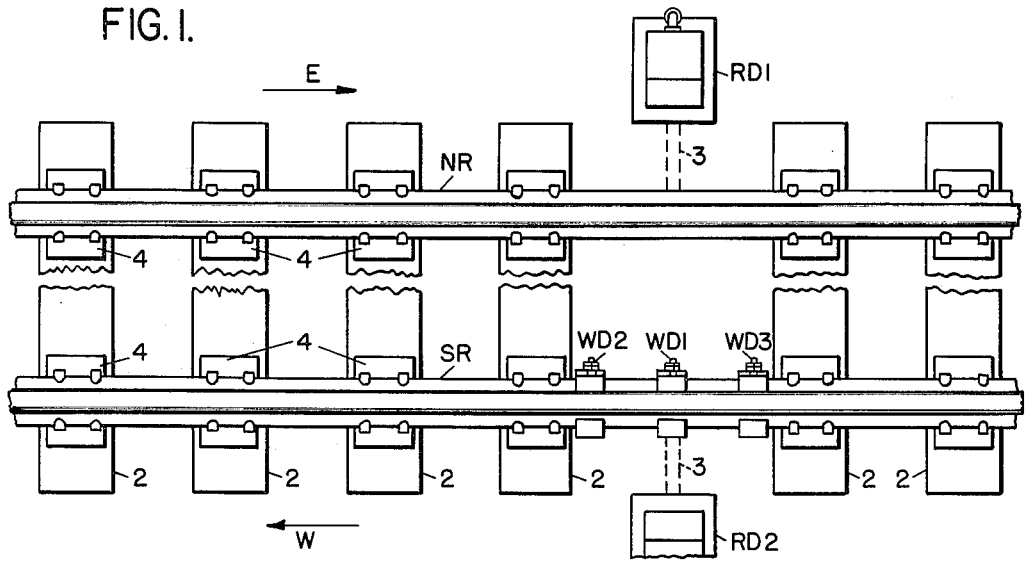
FIG. 1 is a diagrammatic illustration of a railway track having radiometers on both sides thereof and illustrating the various physical relationships involved in the positioning of said radiometers.

FIG. 1 illustrates two trails NR and SR supported by ties 2. A radiometer RD1 is located adjacent the rail NR, and a similar radiometer RD2 is located adjacent the other rail SR. Each of these radiometers scans in the direction indicated by the dotted lines 3, i.e. generally normal to the rails NR and SR. The detection of each wheel is accomplished by wheel detector elements such as elements WD1, WD2 and WD3 which are shown in FIG. 1 as being physically connected to the rail SR. The rails NR and SR are shown to be supported on the ties 2 by the supports 4.

Figure 2:
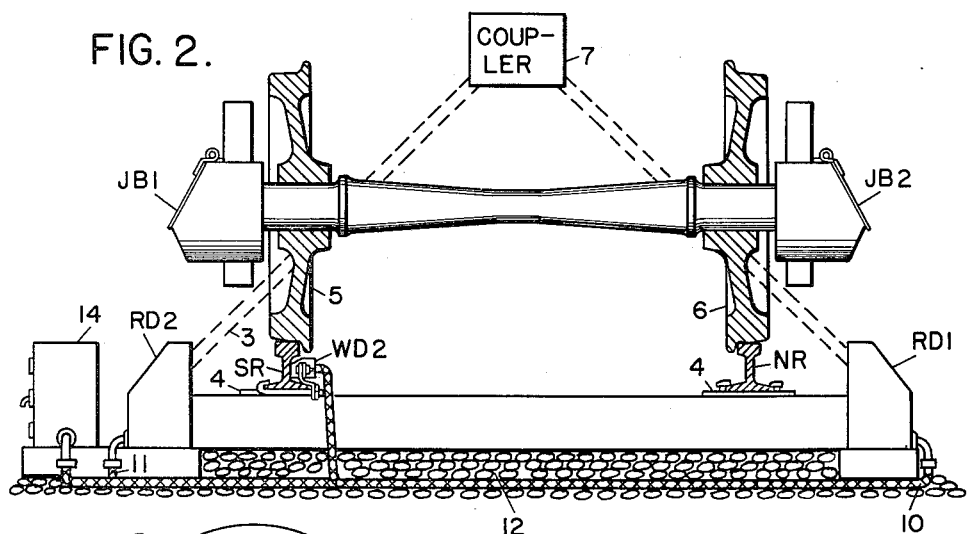
FIG. 2 is an elevational view again showing the positioning of the radiometers in respect to the wheels of a passing train and also shows the location of the wheel detection elements.

FIG. 2 illustrates that the angle of scan of each radiometer as represented by the dotted lines 3 is at an acute angle with the plane of the roadbed. Moreover, the angle of scan is directed to intersect the plane of the wheels 5 and 6 at such a height that the hub of each wheel subtends the angle of scan as the wheel passes through the scanning beam of the radiometer. In order that the angle of scan can thus intersect each wheel hub, each radiometer must be so positioned that its viewing assembly is directed below the level of the journal boxes JB1 and JB2. An additional criterion which helps to fix the location of each radiometer results from the desire that the angle of scan or viewing angle of each radiometer be also subtended by each coupler 7 between successive cars to thereby shield the radiometer from high level solar radiation and thus obviate the need for any shutter arrangement which would otherwise be required to operate for each passing car. These two requirements namely, that the angle of scan intersect successive wheels at the lower portion of each hub and also that it intercept each coupler between cars, quite closely determine the angle of scan as measured with respect to the plane of the track rails, and it is known that this angle is in the order of forty-five degrees. In connection with the distance betwen track rail and radiometer, it is obvious from FIG. 2 that it may be variable to a certain extent since distance from the rail is directly related to elevation with respect to the rail, i.e. the radiometer may be further from the track if it is at the same time lowered so as to remain on the above mentioned line of scan of approximately forty-five degrees.

Figure 3:
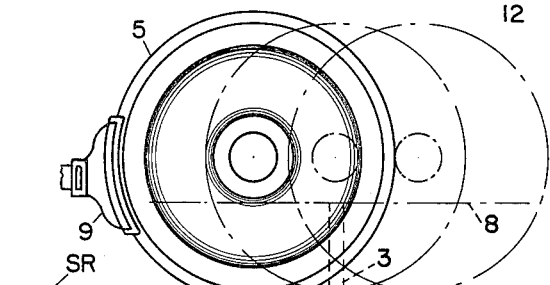
FIG. 3 is a side elevational view of a progressional train wheel having an associated brake shoe and illustrating the various physical relationships of wheel detector elements and a radiometer involved therewith.

Referring to FIG. 3, the horizontal dotted line designated 8 indicates approximately where the angle of scan of each radiometer intersects the plane of the outside of each wheel. From this illustration of a progressional car wheel, it can be seen that the angle of scan not only intersects each wheel hub, but also the wheel web and wheel rim. The brake shoe 9 associated with the wheel 5 is also included in the angle of scan. It will be noted that the wheel 5 and its progressions are shown with respect to the wheel detector elements WD1, WD2 and WD3 for illustrating the location of the angle of scan with respect to the wheel hub and web on either side thereof in relation to the wheel detector elements. It has been found that the wheel detector elements WD2 and WD3 should be located on either side of wheel detector WD1 approximately ten inches in order that the angle of scan be scanning that portion of the web which has the lowest temperature under normal conditions. FIGS. 2 and 3 also indicate connections made from the radiometers RD1 and RD2 via cables 10 and 11 respectively which may be embedded in the ballast 12 and which conduct the signals from such units to equipment cabinet 14 which may be either positioned near one of the radiometers as shown in FIG. 2 or be located some suitable distance away if desired.

The radiometer units RD1 and RD2 are of a type generally well known in the art. Each of the radiometers RD1 and RD2 is generally illustrated in FIG. 5 where each is shown to include a detector assembly D, a shutter S and a shutter solenoid SS. It is generally well known that the detector assembly such as D1 for radiometer RD1 includes an optical system which normally comprises a reflecting element for focusing the heat radiation onto the included infrared responsive element so that an electrical output signal is obtained therefrom which is proportional in amplitude to the heat radiated from the object scanned. The electrical output signals thus derived are then applied to a voltage signal preamplifier such as preamplifier 21 for radiometer RD1. Other circuits are further controlled as will be discussed hereinafter by the outputs from the preamplifiers. In order that the detector assembly D be responsive to heat radiation in the infrared level, a shutter S must be removed from in front of the detector assembly D. The shutter S ordinarily blocks any infrared energy from being received by the detector assembly D, but in the presence of a train, the shutter solenoid SS therefor is energized to control the shutter S to a nonblocking position.

The detector assembly D includes therein a detector cell responsive to infrared radiation for providing an electrical output which corresponds in amplitude to the level of such infrared radiation. In order to increase the sensitivity of the detector cell, it has been found convenient commercially to provide a thermoelectric cooler including two dissimilar metals where an electric current flowing therethrough causes one of the metals to be maintained at a constant, but cool, temperature. This makes use of the well-known Peltier effect. In mounting the detector cell adjacent the metal which maintains a cold temperature, the detector cell is also maintained at a constant temperature so as to increase its sensitivity regardless of ambient temperature conditions.

GENERAL MANNER OF OPERATION

Before proceeding with the detailed description of the circuit organization of this invention, a generalized description will be given with reference to the block diagram of FIG. 4, the detailed circuit diagram of FIGS. 6A and 6B, the typical waveform diagrams of FIG. 7, the typical tape presentations of FIG. 8 illustrative of the waveforms shown in FIG. 7, and FIGS. 1–3 which have already been described.

As has been mentioned, each radiometer unit supplies an output signal whose amplitude is proportional to the level of infrared radiation impinging upon the infrared responsive element included therein. Because the angle of scan is directed in the manner described above, the radiometer output signal has its amplitude successively proportionate to the temperature of each passing wheel with respect to the rim, web and hub thereof. Thus, under various conditions of the journals and brakes, the outputs of one of the radiometer units such as the unit RD2 may appear as shown in the waveform diagrams of FIG. 7.

Referring to FIG. 7, it is seen that four waveforms are shown for different typical temperature conditions of the journal and brakes on a railway car. In considering each waveform, it should be noted that the base line 13 in each case is considered to be at ambient temperature while an indication above the base line 13 is indicated to be a voltage output proportional to a temperature or temperatures above the ambient temperature. A railway car wheel having a normal temperature journal and not having had the brakes applied for some time would provide an output from the radiometer as shown in I where the journal temperature is shown to be slightly above the ambient temperature. Under normal operating conditions, the rim temperatures may be at some temperature slightly above ambient temperature but much less than normal journal temperatures and thus could be considered to be at ambient temperature as shown in waveforms I and III. A railway car included with a train operating so as to provide somewhat frequent braking may indicate that the temperature of the journal is above normal while the temperature of the rim due to the braking has been raised to a level above that of the journal as shown by the waveform in II. In this connection, the rise in journal temperature may be partly due to the increased braking effect and the subsequent rise in temperature of the rims. A railway car having a hot journal only may produdce an output as shown in III which indicates that the temperature of the journal has greatly exceeded the normal temperature. For a railway car having dragging brakes only, the waveform may appear as shown in IV. The temperature of the journal in connection with the waveform of IV is shown to be higher than normal, but this has been found to be due to the excessive heat of the rim, some of which is imparted to the journal through the web. With respect to the waveforms shown in II and IV, it will be noted in the waveform shown in II that a dip is present for the temperatures between the journal and rim, whereas no such dip in temperature is noted in the waveform shown in IV. It is proposed in this invention to compare the temperature at this approximate location of the dip in the waveform to the temperature of the hub which is representative of the journal for determining what influence the rim temperatures have on the journal temperature with appropriate indications being given therefor. It will also be noted in connection with the waveforms of II and IV that one side of each waveform is indicated to be at a higher level than the other side which is indicative of higher temperatures. This is due, of course, to the presence of the brake shoes adjacent the rim of a wheel which may be at an even higher temperature than the wheel rim.

The organization of the present invention is such that it employs the radiometer outputs for which typical illustrations have been shown in FIG. 7 to operate a recorder for causing pen deflections on a tape similar to that shown in FIG. 8. Referring to FIG. 8, typical tape presentations are shown for the typical temperature conditions identified by waveforms I, II, III and IV shown in FIG. 7. In connection with each presentation, it is seen that traces A, B, C and D are included with each which are made by marker and analog pens Nos. 1 and 2. The pen deflections shown in traces A and B in each case are indicative of the normal journal temperatures with no dragging brake conditions as shown only by waveform I of FIG. 7. The deflections for the traces C and D, however, are indicative of the temperature conditions as represented by respective radiometer outputs shown in FIG. 7 and, of course, according to the embodiment of the present invention. These typical tape presentations will be discussed in more detail hereinafter.

The foregoing description shows that the output of the radiometer unit is a composite signal in that it represents the temperature of whatever is being scanned any instant and that it may go to a high value, not only when an overheated journal is being scanned, but also for overheated wheel rims or, for that matter, for any other source of infrared radiation emanating from a passing vehicle. This demonstrates the need for using gating circuits so that the output signal of the radiometer unit will, in effect, be interrogated to determine whether an overheated journal condition exists only at the very instant that the beam of scan of the radiometer units at least partially includes the wheel hub of a wheel included with a passing railway car. In a similar manner, the gating circuits must be effective to interrogate the radiometer signal to determine whether or not the outside influence, i.e. the temperature of the wheel rim, has raised the hub temperature in excess of the value directly attributable to the journal. In this connection, an appropriate comparison is made between hub and web temperatures in order to account for the influence that the temperature of the wheel rim may have on the hub temperature with appropriate indications being given for indicating the relative conditions of the journal and the brakes associated with the wheel.

Various detection devices may be used to control the gating circuits so that each radiometer unit will have its output signal interrogated at the desired times. To effect this result, it has been found practical to provide a track instrument, affixed to the track rail or rails, which provides an accurate indication as to the relative position of each passing wheel with respect to the radiometer unit. The particular track instrument illustrated in the accompanying drawings, and which has been found to work well in practice, employs a permanent magnet with an associated iron core coil affixed to the track rail at a preselected location. As the wheel flange passes through an inductive coupling relationship with the coil, there is a distinctive change in the flux which is provided by the permanent magnet and which links with the turns of the coil. Because of this, a voltage is induced in the coil, and this voltage is applied to an associated electronic circuit and acts thereon to cause it to apply a distinctive output pulse of uniform amplitude to the associated gating circuits.

FIG. 1 shows that one such wheel detector unit WD1 is affixed to one of the track rails and is in substantial alignment with a vertical plane through the beam of scan of the radiometer unit RD2 as indicated by the dotted lines 3. Two other wheel detector elements, WD2 and WD3, are affixed to the same track rail and spaced from the element WD1 on either side thereof a distance of approximately ten inches, as mentioned above. The output of wheel detector element WD1 is derived therefrom as the beam of scan of the radiometer unit RD2 passes over substantially one half of the entire hub of that wheel. In this connection, it is noted that the portion of the hub within the beam of scan for either direction of train travel includes the hottest portion thereof. The output of the element WD1 for either direction of train travel is effective to cause an electronic circuit to be initiated into operation which operation is effective for a predetermined amount of time wherein the output from radiometer RD2 is employed for providing an indication as to the journal condition. The elements WD2 and WD3 are so positioned that in the time between successive output pulses from the wheel detector units WD1 and WD2 or WD1 and WD3, a comparison is made between the output of the unit RD2 for the hub and the subsequent outputs from unit RD2 for the web to determine the influence of rim temperature on hub temperature and thus provide appropriate indications as to the conditions of the journal and associated brakes. The manner in which this interrogation is effected by the gating circuits irrespective of the order in which the output signals from the elements WD1, WD2 and WD3 are received will subsequently be described.

Referring to FIG. 3, it will be noted that when the wheel 5 is passing over wheel detector element WD2, the beam of scan 3 of the unit RD2 includes the outer portion of the web which portion has the lowest temperature existing between the hub and rim of wheel 5 in accordance with the journal and rim therefor having normal temperatures. If it is assumed that the wheel 5 progresses along the rail SR in a direction from left to right, it can be readily seen that, when the wheel 5 is directly over wheel detector element WD1, the beam of scan 3 of unit RD2 includes the hottest portion of the hub for wheel 5. If it is assumed that the wheel 5 proceeds further along the rail SR so that it is directly over the element WD3, it can be readily seen that the beam of scan 3 includes the corresponding portion of the web, but opposite to that portion being scanned when the wheel 5 is directly over element WD2. The inclusion of brake shoe 9 may cause the temperatures of the web which is scanned on either side of the hub for wheel 5 to vary according to the amount of braking which has been effected. Thus, for a wheel having had the brakes recently applied or at present dragging, the output from unit RD2 would be greater for the portion of the web in the beam of scan which is adjacent the brake shoe 9. The waveforms shown in FIG. 7, and more particularly waveforms II and IV, are representative of this condition just generally described.

From the description previously given, it can now be realized that the gating circuit which interrogates the output of the detector unit to ascertain that portion of the web from which infrared heat radiation is employed is controlled by the output of the wheel detector elements WD2 and WD3. This gating circuit is rendered active throughout the time between successive outputs from element WD1 and element WD2 or element WD1 and element WD3 depending upon the direction of train travel and such gating circuit is effective only according to an output being supplied first from element WD1.

To summarize, the gating circuits which effect separate interrogation of the radiometer output signals to detect overheated journals and to compare the web temperatures with the hub temperature to determine what influence the rim temperatures have on the hub temperature are effective for either direction of travel. One gating circuit interrogates the radiometer output for determining the journal temperature during a predetermined time following the passage of a wheel over wheel detector element WD1, and a second gating circuit interrogates the radiometer output during the time that the wheel is passing between either elements WD1 and WD2 or elements WD1 and WD3 depending upon the direction of train travel for thereafter providing a comparison to determine the influence that the temperature of the rim has upon the journal.

Where the two radiometer units for the two sides of a train are directly opposite each other as shown in FIG. 1, the gating circuits may be used in common for both and only one set of wheel detector elements need be employed to control the gating circuits. It is, of course, within the scope of this invention that there be different sets of wheel detector elements for the two different track rails, and where this is done they may be either placed directly opposite each other or not, as is desired. Where they are not opposite each other, different gating circuits may be used for the different radiometers, and these radiometers then also need not be placed directly opposite each other. The arrangement of FIG. 1 is ordinarily preferred, however, because of the simplicity and economy of apparatus which it entails. Where the arrangement of FIG. 1 is desired with the radiometer units directly opposite each other and with only one set of three wheel detector elements being employed, however, it should be recognized that it is not a requirement that all the wheel detector elements be on the same rail; the gating circuits will operate in a satisfactory manner and in accordance with the description given whether they are on the same or on different rails.

The output of each radiometer is a low-level, unidirectional output voltage, and this must be substantially amplified in order to be of use. Direct current amplification is employed in the present invention by providing a novel voltage signal D.C. pre-amplifier such as the pre-amplifier 21 and a voltage signal amplifier such as the voltage signal amplifier 22 illustrated in FIG. 4 as being associated with radiometer RD1. The function of the pre-amplifier 21 is to amplify the output received from radiometer RD1 to a sufficient degree and to maintain such output directly proportional to the output received from radiometer RD1. The output of the D.C. pre-amplifier 21 is applied to the amplifier 22 where it is further amplified. In this connection, the amplifier 22 includes an adjustment circuit employed for the purpose of establishing the no-signal condition of amplifier 22 which will be discussed in more detail hereinafter. Two outputs are derived from the amplifier 22, one of which is applied to the hub signal storage circuit 20 and the other is applied to the hub and web signal comparing circuit 23. As will subsequently be discussed in detail, the hub signal storage circuit 20 receives a gating voltage only throughout a predetermined time that the radiometer unit RD1 is scanning a portion of the hub of each passing wheel, i.e. only while the center of each wheel is passing wheel detector element WD1 and for a predetermined period thereafter as determined by the gating circuit. The hub and web signal comparing circuit 23 receives a gating voltage only throughout the time that the radiometer unit RD1 is scanning a portion of the hub and a selected portion of the web of each passing wheel, i.e. only while each wheel is traversing the area between wheel detector elements WD1 and WD2 or elements WD1 and WD3 depending upon the direction of train travel.

When the hub signal storage circuit 20 receives the output from amplifier 22 which is representative of hub temperature, it is normally shunted to ground except that when the gating voltage referred to above is simultaneously received for the predetermined time, the output is stored for future use according to the arrival of another gating pulse from the gating circuit. In order that an output be derived from the hub signal storage circuit 20 which is useable with a recorder to cause pen deflection, another gating signal of longer duration is applied to the circuit 20 for thus producing an output from circuit 20 having a duration sufficiently long to operate a pen. In this manner, the amount of pen deflection according to the output from the circuit 20 is representative of the journal temperature of a passing wheel. A subsequent examination of the resulting trace provided by the pen indicates which of the journals, if any, are operating at unduly high temperatures.

The same output from circuit 20 applied to the recorder is also applied to the hub and web signal comparing circuit 23 and is stored therein for providing a comparison with signals representative of web temperatures at some later time in accordance with a gating voltage derived from the gating circuit. The signal outputs from the radiometer unit RD1 which are representative of the web temperatures of a passing wheel are applied to the circuit 23 and are therein compared to the signal derived from circuit 20 according to a gating voltage received from the gating circuit. In this connection, should the output from the radiometer representative of hub temperature be abnormally greater than the output representative of web temperature, an output is derived from circuit 23 to cause a marker pen in the recorder to be deflected. On the other hand, when the output from radiometer RD1 indicative of hub temperature is at a substantially normal predetermined level or is less than the output indicative of web temperature, no output is derived from the circuit 23 for operating a marker pen to cause a deflection. In this connection, a comparison of the deflections for the analog and marker pens should be made to determine whether or not the rim temperatures have influenced the indications representative of hub temperatures and, more particularly, journal temperatures. A deflection of an analog pen with a deflection of the corresponding marker pen is an indication that the analog pen deflection is representative of the journal temperature and has not been influenced by rim temperatures. By contrast, a deflection of an analog pen without a deflection of a corresponding marker pen is an indication that either the hub temperature is indicative of a normal journal temperature or the rim temperatures for a passing wheel are higher than the hub temperatures, thus providing an indication of dragging brakes; a deflection of the analog pen which is greater than a normal deflection is in this case an indication of the rim temperatures being imparted partially to the hub and thus directly influencing the hub temperature.

When the above comparison has been made in connection with a particular wheel and prior to the arrival of the next wheel, the signal stored in the hub signal storage circuit 20 which has been applied to the circuit 23 is caused to be passed to ground at the end of the second gating pulse referred to above for lengthening the output of circuit 20. The signal which is stored in the hub and web comparing circuit 23 representative of the hub temperature is caused to be passed to ground when the particular wheel passes over either wheel detector elements WD2 and WD3 according to the direction of train travel and the gating pulse referred to above is derived therefrom. Thus, the circuits 20 and 23 are enabled respectively to store and compare the signals representative of hub and web temperatures for the next wheel.

The above description has been given with particular reference made to the manner in which the output of the radiometer RD1 is utilized to give detection of both dragging brakes and overheated journals with an indication as to the source of heat radiation causing an increase in hub temperature. In an analogous manner, the voltage signal pre-amplifier 27 and the voltage signal amplifier 28 are employed with the radiometer unit RD2. The signals from the voltage signal amplifier 28 are supplied to the hub signal storage circuit 26 and the hub and web signal comparing circuit 29 which are operated in a similar manner to circuits 20 and 23 respectively according to gating outputs for providing pen deflections indicative of the journal temperature and pen deflections indicative of the brake condition as well as an indication of the influence that the temperatures of the rim of a passing wheel has on the hub and thus the journal thereof.

Figure 4:
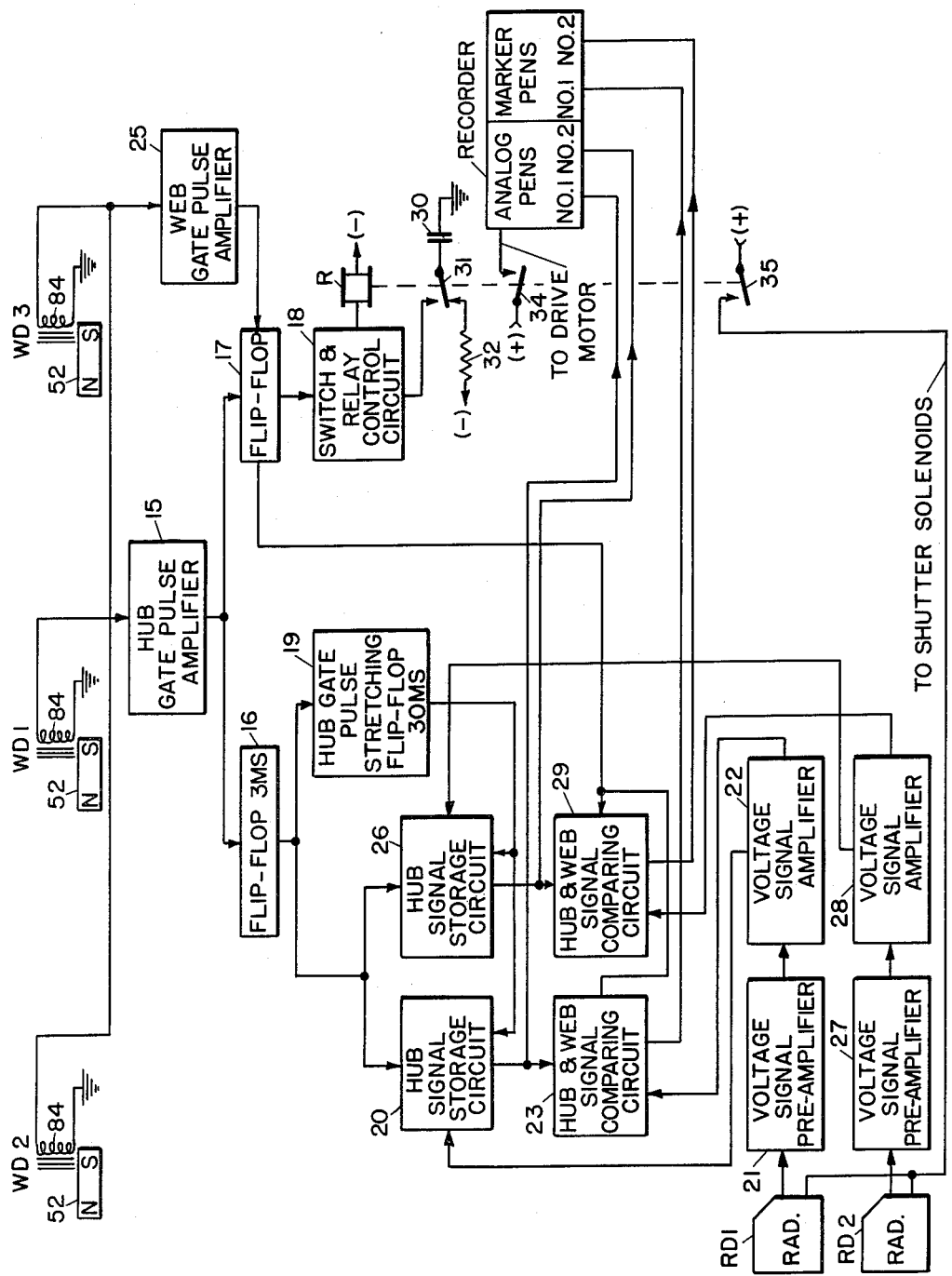
FIG. 4 is a block diagram of the system of this invention.

The gating voltages referred to above are derived from the two flip flops 16 and 17 shown in both FIGS. 4 and 6A. As shown in FIG. 4, these flip flops 16 and 17 are operated by the pulses obtained from the respective wheel detection elements. The hub gate pulse stretching flip flop 19 shown in both FIGS. 4 and 6A is operated by a pulse obtained from flip flop 16 and is employed to operate circuits 20 and 26 as described above for lengthening the output pulse thereof to operate respective analog pens. A more detailed description of the mode of operation of these flip flop circuits will be presented below; it is deemed sufficient for the present to recall, as previously described, that the flip flop 16 supplies its gating voltage for a predetermined time after a wheel passes element WD1, while the flip flop 17 provides its gating voltage throughout the time interval that a wheel first passes wheel detector element WD1 and then passes either wheel detector element WD2 or WD3 according to the direction of train travel. Also, the flip flop 19 provides its gating voltage for a predetermined time following the return of flip flop 16 to its original condition.

A relay R is also provided and is controlled by a switch and relay control circuit 18 which receives its input from the flip flop 17. As a train passes the radiometer locations, the flip flop 17 is operated for each passing wheel to the condition wherein it provides the required gating voltage for operating the switch and relay control circuit 18 for insuring that the relay R is energized. To insure that the relay remains energized for a predetermined period following the operation of flip flop 17 to its non-gating condition, a capacitor 30 which is normally energized through back contact 31 of relay R and resistor 32 is effective to hold the relay R energized for a predetermined period after the gating voltage from flip flop 17 ceases. Thus, for a train that passes the radiometer location, the relay R remains energized, while for a train that stops in the vicinity of the radiometer location, the relay R is held energized for a short period of time following the passage of the last wheel over either element WD2 or WD3 according to the direction of train travel.

One use that is made of the relay R is to control the motor operation of the recorder through its front contact 34. When this front contact 34 closes upon the arrival of a train at the radiometer location, electrical energy is applied through the contact to the recorder to set it into operation.

An additional function of the relay R involves its control of the shutter solenoids for the radiometers RD1 and RD2 through its front contact 35. The radiometer units RD1 and RD2 are thus enabled to receive infrared heat radiation from objects only during the time that relay R is energized to control the shutters to a nonblocking position.

Still another function of relay R involves its control of relay SCR by means of which the shutters on the radiometers are alternately operated to a nonblocking position. This control is illustrated in FIG. 5 which shows a track circuit including the track rails SR and NR and defined by the insulated joints 38–41. The track circuit is energized by a battery 42 which supplies current to the track rails through the limiting resistor 44. Track relay TR is connected across the track rails with the opposite end of the track section and is normally energized by the current flowing in the track rails but is dropped away whenever a train occupies the track section and shunts the track rails.

The shutter control relay SCR is energized by a pick up circuit including front contact 46 of relay R so that relay SCR is picked up whenever relay R is energized upon the passage of a train. A stick circuit is provided to maintain the relay SCR picked up when once picked up through a circuit which extends from (+), through back contact 48 of relay TR, through front contact 49 of relay SCR, through the winding of relay SCR, to (—). Ordinarily, it is not until the train has vacated the track section so that track relay TR can be restored to its normal picked up condition that energy is removed from the winding of relay SCR. In this connection, the shutter solenoids for radiometers RD1 and RD2 have their energizing circuits completed through front contact 50 of relay SCR; thus the shutter solenoids are energized once relay SCR has been energized and remain energized until such time as the relay SCR is deenergized following the time that a train vacates the track circuit. At this time, the shutters for radiometers RD1 and RD2 are permitted to be restored to their normal protective positions.

In describing the general mode of operation of the flip-flops 16, 17 and 19, reference will be made not only to the block diagram of FIG. 4, but also to the detailed circuits of FIGS. 6A and 6B, particularly FIG. 6A.

The three flip-flop circuits 16, 17 and 19 respectively provide the three gating voltages previously mentioned, the gating voltage provided by flip-flop 16 existing for a predetermined period of time following the passage of a wheel over wheel detector element WD1 where the radiometer is scanning the associated wheel hub, the gating voltage provided by flip-flop 17 existing throughout the time after a wheel passes wheel detector element WD1 and when such wheel passes wheel detector element WD2 or wheel detector element WD3 according to the direction of train travel, and the gating voltage provided by flip-flop 19 being provided for a pretermined length of time after flip-flop 16 has been returned to its original operating condition. The flip-flops 16 and 17 are operated by the respective wheel detection circuits. Thus, as each wheel flange passes into and then out of an inductive coupling relationship with the permanent magnet 52 associated with a particular wheel detector element, a voltage pulse is generated which causes the associated pulse amplifier such as the hub gate pulse amplifier 15 to be operated for providing a negative-going pulse output to flip-flops 16 and 17. The web gate pulse amplifier 25 associated with wheel detector elements WD2 and WD3 provides a negative-going voltage pulse output which is applied to only the flip-flop 17.

For a train traveling from left to right and causing voltage pulses to be provided in succession by the wheel detector elements WD2, WD1 and WD3, in that order, the pulse amplifiers 15 and 25 are operated in accordance with each voltage pulse to provide their negative-going voltage pulses for the flip-flops 16 and 17. The negative-going pulse from pulse amplifier 25, which in this case is first operated, supplies its negative-going output pulse to the flip-flop 17 where it is differentiated. The normal condition of flip-flop 17 is such that the differentiated negative-going output pulse has no effect thereon and thus does not disturb the quiescent condition of the circuits. When the pulse amplifier 15 provides a negative-going output which is differentiated, however, the flip-flops 16 and 17 are each operated to their opposite position for initiating the gating voltages described above. It will be noted that the flip-flop 16 includes elements therewith which have certain values for causing the flip-flop 16 to revert to its original condition after a short interval of time. At the conclusion of this interval of time, the positive-going output pulse is terminated and the flip-flop 16 then provides a negative-going output pulse. The flip-flop 19 being responsive to the negative-going output pulse in differentiated form then provides a positive-going pulse for a predetermined period of time which is greater than that for flip-flop 16 as determined by the values of the elements included therewith. These gating voltages obtained from the flip-flops 16, 17 and 19 respectively are applied to the wires 55, 56 and 57 and to the circuits 20, 23, 26 and 29 as will subsequently be described in more detail.

For the opposite direction of travel, each successive wheel causes an output pulse to be produced first by the pulse amplifier 25, but these pulses do not operate flip-flop 17 since it is in its normal condition. When each successive wheel causes an output pulse to be produced by pulse amplifier 15, the flip-flops 16, 17 and 19 are operated in the manner described above for providing the output gating voltages with the output pulse from pulse amplifier 25 being effective to operate flip-flop 17 to its original condition. In this respect, it will be noted that the operation of wheel detector element WD2 is effective to cause the flip-flop 17 to be operated by the differentiated negative-going ouput pulse from pulse amplifier 25. The detailed description that follows for these particular circuits will make it evident that the normal conditions of flip-flop 17 causes the operation thereof by output pulses from wheel detector elements WD2 and WD3 entirely dependent upon the direction of travel of that wheel.

DESCRIPTION OF DETAILED CIRCUITS

The detailed circuits shown in FIGS. 6A and 6B will presently be described in order that a more complete understanding of the present invention can be attained. In this connection, the circuits shown in FIGS. 6A and 6B are those which are associated with a single one of the radiometer units and, more particularly, radiometer unit RD1. It should be understood that similar circuits are provided for radiometer RD2, but these will not be described in detail.

*Amplifier circuits*

With reference to FIG. 6B, the manner in which the undirectional output signal of the radiometer is amplified is illustrated therein. More particularly, the unidrectional output signals of the radiometer are first amplified by a voltage signal pre-amplifier 21 and then are further amplified by the voltage signal amplifier 22.

Because of the desirability of employing a signal which is substantially representative of the output of the radiometer, the voltage signal pre-amplifier 21 should amplify the output signal in a linear manner and, for this reason, the pre-amplifier 21 is of the differential linear amplifier type. The transistors Q1 through Q8 act to amplify the outputs from radiometer. It should be noted that all of the transistors Q1–Q8 are normally partially conducting which conduction is varied according to the output from the radiometer unit RD1. More particularly, the capacitor 60 couples the output from the radiometer RD1 into the base circuit of transistor Q1 which thus effects the operation of transistor Q1 according to the direction in which the output is going. That is, the output of the radiometer may be going in either a positive or negative direction according tot he heat radiation received; thus, the conduction of transistor Q1 either increases or decreases. The conduction of transistor Q3 has an opposite effect while the conduction of transistors Q5 and Q7 have a similar effect to the conduction of transistor Q1 for providing an output similar, but amplified, to the output from the radiometer. The output is taken from the point between the collector of transistor Q7 and resistor 63 and is fed back to the base of transistor Q2 through resistors 64 and 65 and is attenuated by a resistor 66 for permitting the conduction of transistor Q2 to decrease the gain of transistor Q1 and, therefore, to control the total gain and linearity of pre-amplifier 21. The diode 68 is employed to clamp the signal voltages to a predetermined voltage value, while the relatively large capacitor 69 is employed to bypass all output signals supplied from the collector circuit of transistor Q7 in order to provide a zero voltage D.C. level at the output of pre-amplifier 21 for the stabilization thereof. To further stabilize the operation of the pre-amplifier 21, breakdown diodes 71 and 72 are included with the pre-amplifier 21 to stabilize the effects of the power supply thereon.

The amplified voltage output from the pre-amplifier 21 is also applied to the voltage signal amplifier 22. This voltage output signal is applied to the base of transistor Q9 through capacitor 74 and causes the normally inoperative transistor Q9 to become conductive. As will be explained more fully hereinafter, a signal or pedestal voltage will be supplied to the analog pen for indicating a normal journal temperature where the voltage signal amplifier 22 has not provided an amplified signal of an amplitude able to overcome a threshold voltage control circuit employed with circuit 20. Q10 which is normally cut off and transistor Q11 which is normally conducting follow the operation of transistor Q9 for providing respective outputs over wires 78 and 79 to the circuits 23 and 20. More particularly, should transistor Q9 receive an output pulse from pre-amplifier 21 sufficiently large as compared to the threshold voltage for causing it to conduct, the transistor Q10 is biased such that it conducts, while the transistor Q11 is also biased by the conduction of transistor Q10 such that it is cut off. In the operation of the signal dector and amplifier 22, the diode 81 is employed to stabilize the operation of transistors Q9 and Q10 while the resistor 82 is employed to adjust the height of the output pulse from the voltage signal amplifier 22.

*Wheel detector circuits*

Each wheel detector includes a permanent magnet 52 which is affixed to the track rail in such a manner that the flange on each passing wheel moves into and subsequently out of an inductive coupling relationship with the magnetic field established by the permanent magnet. As a result of the flux change that occurs, a voltage is induced in the associated winding 84 having a voltage wave shape of generally sine-wave form. For wheel detector element WD1, this voltage is applied to the hub gate pulse amplifier 15, while for wheel detector elements WD2 and WD3, this voltage is applied to the web gate pulse amplifier 25. Description of amplifier 15 will suffice for both amplifiers 15 and 25 since these amplifiers are similar. This voltage, particularly the negative portion thereof, is applied effectively to the base of transistor Q12 through resistor 86 to cause such transistor Q12 which is normally cut off to conduct dependent upon the effectiveness of its emitter biasing circuit. Conduction of transistor Q12 causes the base of transistor Q13 to be placed at a positive (+) potential because of the voltage drop across resistor 88. The normally conducting transistor Q13 is thus cut off for a period of time according to the conductive condition of transistor Q12. During the cut off period of transistor Q13, a negative-going output pulse is derived from its collector circuit and applied to the flip-flops 16 and 17. The operation of amplifier 25 is similar to that of the amplifier 15 and its negative-going output pulse is applied only to flip-flop 17. It will be noted that the amplifiers 15 and 25 include test buttons TB1 and TB2 for at times causing respective transistors Q12 and Q14 to conduct and respective transistors Q13 and Q15 to non-conduct to provide the negative-going output pulses for test purposes.

Also, capacitors 85 and 90 are respectively connected across the coils 84 for wheel detectors WD1, WD2 and WD3 to prevent erroneous circuit operation from stray frequencies.

*Flip-flops 16 and 17*

The flip-flop 16 includes transistors Q16 and Q17 with associated elements arranged in a manner to cause transistor Q16 to be normally conducting and transistor Q17 to be cut off when no train is present. Similarly, flip-flop 17 includes transistors Q18 and Q19 with associated elements arranged in a manner to cause transistor Q19 to be conducting and transistor Q18 to be cut off when no train is present. The manner in which flip-flops 16 and 17 are operated in the presence of a train will subsequently be described in detail.

Each of the two flip-flops comprises a bistable state circuit organization frequently also known as an Eccles-Jordan trigger circuit. Each flip-flop comprises two interconnected transistors as mentioned above with their interconnections being such that one and only one of these transistors for each flip-flop can be conductive at any time, the other transistor then being fully cut off.

The operation of flip-flop circuits of this kind is well known in the art so that it is deemed unnecessary to describe them in any great detail here, but only to describe them as to their particular operations in the present invention. Generally speaking, and with particular reference to flip-flop 16, the transistor Q16 is normally conducting which causes a potential drop across resistor 92 in a direction to cause the base of transistor Q17 to be at substantially ground potential, thus insuring that transistor Q17 remains cut off. When a negative-going output pulse is received from amplifier 15, it is first differentiated through capacitor 93 and the positive spike resulting therefrom is applied to the base of transistor Q16 through the steering diode 94. The transistor Q16 is in this manner cut off which condition allows the base of transistor Q17 to go to a negative (—) potential to thus cause the conduction of transistor Q17. The flip-flop 16 remains in this state of operation for a predetermined period of time or in the order of three milliseconds according to the values of the elements including capacitor 95. Thus, for such predetermined period of time the flip-flop 16 provides a positive-going voltage output which is supplied to the hub signal storage circuits 20, and 26 over wire 55 and also to the hub gate pulse stretching flip-flop 19.

The flip-flop 17 is similar in operation to the operation of flip-flop 16 except that the negative-going output pulse supplied from amplifier 15 is differentiated by capacitor 97 and the negative spike is applied to the base of the normally cut off transistor Q18 through steering diode 98. On the arrival of such output pulse from amplifier 15, the transistor Q18 is initiated into conduction while the transistor Q19 is cut off. Flip-flop 17 remains in this condition for a period of time as determined by the travel time of a wheel between wheel detector element WD1 and either of the wheel detector elements WD2 and WD3. A negative-going output pulse received from amplifier 25 which has been operated as a result of a wheel passing either wheel detector element WD2 or WD3 is differentiated by capacitor 100 and the negative-going spike applied to the base of transistor Q19 through steering diode 101 to cause the transistor Q19 to resume its conducting condition while cutting off transistor Q18. It will be noted that a negative-going output pulse derived from amplifier 25 will not be effective on flip-flop 17 unless a first negative-going output pulse was derived from amplifier 15 for causing a reversal of conditions for transistors Q18 and Q19. During the conducting state of transistor Q18 a positive-going pulse is supplied to the hub and web signal comparing circuits 23 and 29 over wire 56. During the nonconducting state of transistor Q19, a negative-going output pulse is supplied to the switch and relay control circuit 18.

It follows from the description given above in connection with the operation of flip-flops 16 and 17 that regardless of the direction of train travel, i.e., from left to right or right to left, the operations thereof remain in their quiescent condition until a wheel has first traversed wheel detector element WD1. It will be recalled that the transistor Q19 included with flip-flop 17 is normally conducting so that the reception of a negative-going output pulse from the web gate pulse amplifier 25 as a result of either of the wheel detector elements WD2 and WD3 being traversed by a wheel does not materially effect the operation thereof. It is only when a negative-going output pulse is first received from the hub gate pulse amplifier 15 to effect a reversal of the conducting and cut off conditions of transistors Q18 and Q19 that the flip-flop 17 provides its gating outputs referred to above. In this connection, the web gate pulse amplifier 25 is operated according to output pulses received from either of the wheel detector elements WD2 or WD3 before a pulse output is supplied from wheel detector element WD1, but the pulse amplifier 25 quickly reverts to its quiescent condition wherein the transistor Q14 is cut off and the transistor Q15 is conducting. Thus, it is apparent that the gating circuit is operative for either direction of train travel with the initial operation of flip-flops 16 and 17 being dependent upon a given wheel of a train first traversing wheel detector element WD1.

*Hub gate pulse stretching flip-flop*

The positive-going output pulse supplied from the flip-flop 16 to the hub gate pulse stretching flip-flop 19 is effective to cause a reversal of conditions of such flip-flop 19 for thus causing a positive-going output pulse having a duration in the order of thirty milliseconds to be supplied over wire 57 to the circuits 20 and 26. More particularly, the flip-flop 19 which includes transistors Q26 and Q27 is normally in the state where transistor Q27 is conductive and transistor Q26 is cut off. The positive-going output pulse from the flip-flop 16 of approximately three milliseconds duration is differentiated by capacitor 103 with the negative spike thereof being applied to the base of transistor Q26 through steering diode 104. It will be noted that the steering diode 104 is connected in the base circuit of transistor Q26 in a direction to allow only the negative spike to be effective to change the potential on the base of transistor Q26 from the substantially ground potential to a more negative (—) potential. Normally, the base of transistor Q26 is placed at substantially ground potential as mentioned above in view of the potential drop across resistor 105 which occurs as a result of the transistor Q27 being in a conductive state. The positive-going output pulse which is approximately thirty milliseconds duration because of the values selected for the elements included in flip-flop 19 and including capacitor 107 is applied to the circuits 20 and 26 over wire 57.

*Switch and relay control circuit*

When the operative state of flip-flop 17 is reversed to the condition where Q18 is conductive and Q19 is cut off, a negative-going output pulse is derived from the collector circuit of transistor Q19 and resistor 108 and is applied to the switch and relay control circuit 18 for causing the operation thereof to energize the relay R. The control circuit 18 which includes transistor switch Q33 and transistors Q34 and Q35 connected in a well known Schmitt trigger circuit is normally held in a state where the transistors Q33 and Q34 are in a conductive condition and the transistor Q35 is in a cut off condition, thus causing the energizing circuit for relay R to be disconnected. Upon the arrival of the negative-going output pulse from flip-flop 17, the base of transistor Q33 is placed at a negative (—) potential as determined by the biasing circuit in the base circuit and, in particular, the potential drop across resistor 110. The transistor Q33 is thus cut off which causes the base of transistor Q34 to be placed at substantially ground potential. Because of this, the transistor Q34 is likewise cut off. During the conduction of transistor Q34, a potential drop was caused across resistor 111 to thus cause the base of transistor Q35 to be placed at substantially ground potential, but when transistor Q34 was cut off, the biasing circuit for the base of transistor Q35 placed such base at a negative (—) potential due to the drop across resistor 113 to cause the conduction thereof. The relay R being in the collector circuit of transistor Q35 and having one side connected to (—) has its energizing circuit connected as transistor Q35 begins to conduct and it is thus energized.

The negative-going output pulse received from flip-flop 17 lasts for the duration of time existing after a wheel passes wheel detector element WD1 and then passes either wheel detector WD2 or WD3 according to direction of train travel. To insure that the relay R remains energized until the next wheel is effective to operate the wheel detector elements WD1, WD2 and WD3 for a moving train, a resistor-capacitor arrangement including capacitor 30 and resistor 32 is employed to hold the control circuit 18 in a condition to sustain the energization of relay R. More particularly, during the deenergized condition of relay R the capacitor 30 is charged through back contact 31 of relay R, but in the energized condition of relay R, one side of capacitor 30 is connected through front contact 31 of relay R to the base biasing circuit for transistor Q33 and to the input from flip-flop 17 including diode 115. This arrangement is effective to cause the charge on capacitor 30 during the energized condition of relay R to be maintained during the time that the negative-going output pulse is applied from flip-flop 17 to the control circuit 18, but this charge is effective thereafter to cause the control circuit 18 to remain in the condition where the relay R is energized for a predetermined time. The relay R is thus maintained energized during the time elapsing when one wheel leaves the wheel detector elements and another succeeding wheel approaches and traverses the wheel detector elements.

*Relay R*

Relay R is picked up in response to the first operation of flip-flop 17 from one condition to the other and this relay remains picked up as long as flip-flop 17 is alternately operated between its opposite stable conditions by the successive passing wheels of a train according to the description just given above. During the energized condition of the relay R, control energy is supplied to the recorder through its front contact 34 for operating the recorder in accordance with a passing train. It should be noted that should the train either vacate the location of the wheel detectors WD1, WD2 and WD3 or that the train stop within the presence of the wheel detector elements, the relay R would then remain picked up for a predetermined time according to the effectiveness of the charge on capacitor 30 on the switch and amplifier control circuit 18 as described above. At the conclusion of this predetermined time, the relay R is deenergized and the control energy to the recorder is removed by front contact 34, causing the drive of the recorder to stop.

During the energization of relay R, control energy is also supplied to the radiometers RD1 and RD2 for causing the shutter mechanisms included therewith to be removed from their normally protective positions so that the heat radiation from objects on the train which are scanned can be effective to cause the radiometers to provide voltage outputs which are representative of the level of the heat radiation. When the relay R is deenergized when a train either vacates the presence of the wheel detector elements or stops in the presence of the wheel detector elements, the control energy to the shutter mechanisms for radiometers RD1 and RD2 is removed to thus cause the shutters to again assume their protective positions. Alternately, subsequent to the energization of relay R, the shutters are each controlled to a nonblocking position as relay SCR is energized via front contact 46 of relay R and is maintained energized until the train vacates the track section, as described above in connection with FIG. 5.

*Hub signal storage circuits*

As previously mentioned, the negative-going output pulse from the emitter circuit of transistor Q11 which is representative of the hub temperature is applied to the hub signal storage circuits 20. More particularly, this output signal is applied over wire 79 to the base of transistor Q21, but because the transistor Q20 which is normally conducting has its collector circuit connected to the base of transistor Q21, the negative-going output pulse is passed to ground through transistor Q20 in the absence of a gating voltage from flip-flop 16. The circuits 20 and 26 respectively store the negative-going output pulses in the presence of gating voltages and further apply the stored voltage to the recorder and respective hub and web signal comparing circuits 23 and 29. In the present case, when the output from flip-flop 16 is received over wire 55, it is capacitively coupled by capacitor 117 to the base of transistor Q20 through resistor 118 and to the base of transistor Q22 through a diode 120. In the presence of such positive-going output pulse from the flip-flop 16, the transistors Q20 and Q22 are cut off for the duration of the output pulse. During this period, any negative-going signal which is received from the voltage signal amplifier 22 and applied to the base of transistor Q21 is stored in a capacitor 122 to thereby provide a stored signal which is representative of the amplified radiometer output. In this connection, the negative-going output signal from the voltage signal amplifier 22 must at least partially override the breakdown voltage of breakdown diode 123 which is provided to insure that the signal stored on capacitor 122 is clearly a signal which is representative of an abnormal temperature condition of the hub being scanned. It is to be understood that the breakdown voltage characteristics of breakdown diode 123 may be selectable according to the output signal levels from amplifier 22 desired to be stored and to the adjustment circuit included with amplifier 22 as employed in different applications. Once the capacitor 122 is charged, the diode 125 prevents the capacitor 122 from discharging any of its charge. Thus, the charge on capacitor 122 is a true representation of the heat radiation above a certain level for a hub being scanned.

With the transistor Q22 being cut off for a period determined by the duration of the positive-going output signal from the flip-flop 16, the charge on capacitor 122 is applied to the base of transistor Q23 which is normally in a cut off state for causing the transistor Q23 to become conductive and to provide a negative-going output pulse which is similar to the charge on capacitor 122 to be applied to the base of transistor Q25. However, because the transistor Q24 is normally conductive, this output to the base of transistor Q25 has no effect thereon, but the conductive state of transistor Q24 places the base of transistor Q25 at substantially ground potential. It will be recalled that a positive-going output pulse is supplied from the flip-flop 19 following the output pulse from flip-flop 16 and this is applied to the base of transistors Q24 and Q22 through the capacitor-resistor arrangement including capacitor 129 and resistor 130 and the diode 131 respectively. For the duration that this positive-going output pulse is applied, normally conductive transistors Q22 and Q24 are cut off. With transistor Q24 thus cut off for this period of time, the negative-going output pulse derived from the emitter circuit of transistor Q23, and more particularly due to the potential drop across resistor 133, is applied to the base of transistor Q25. Transistor Q25 thus is placed in a conductive state for a period of time as determined by the duration of the positive-going output pulse from the flip-flop 19. A negative-going output pulse representative of the temperature of the hub scanned which is above a predetermined level is taken from the emitter circuit of transistor Q25 including resistor 136 and is applied to the analog pen No. 1 of the recorder and also applied to the hub and web signal comparing circuit 23.

For conditions where the hub temperature is not abnormal, but is at a normal temperature, the hub signal storage circuits 20 and 26 are effective to provide an output to the recorder and the circuits 23 and 29 respectively which is only dependent upon the gating voltage being applied to the circuits 20 and 26 from the flip-flop 19. With reference to the hub signal storage circuit 20, it will be noted that a resistor circuit including resistors 137 and 138 is connected between ground and (—) and is further connected to the collector circuit of transistor Q24 and the base of transistor Q25 through a diode 140. During the time that the output pulse from the flip-flop 19 is not available, the conductive state of transistor Q24 causes this circuit arrangement to be ineffective to place the base of transistor Q25 at a negative (—) potential, but when the output pulse from flip-flop 19 is effective to cut off transistor Q24, the base of transistor Q25 is placed at a negative-potential to thus cause such transistor to become conductive. A negative-going pulse or pedestal is then derived from the emitter circuit of transistor Q25 and applied to the analog pen No. 1 of the recorder and to the hub and web signal comparing circuit 23. Thus, a pen deflection is made for each wheel which traverses the wheel detectors WD1, WD2 and WD3 to cause operation of the gating circuit which facilitates location of a wheel giving an abnormal indication.

*Hub and web signal comparing circuits*

As mentioned above, the negative-going output pulse derived from the emitter circuit of transistor Q25 is applied to the hub and web signal comparing circuit 23, and, more particularly is employed to charge a capacitor 142 to a voltage value commensurate therewith. Capacitor 142 is charged in this manner only according to the arrival of a gating voltage from the flip-flop 17 to cause the transistor Q28 which is normally conducting to be cut off. When such output is not present, the conduction of transistor Q28 passes the negative-going output signal of the circuit 20 to ground and thus capacitor 142 is not charged. When the positive-going output pulse is derived from flip-flop 17 and applied to the base of transistor Q28 through the capacitor 143 and resistor 144, transistor Q28 is cut off for the duration of such output pulse to thus permit the capacitor 142 to be charged according to the output of circuit 20.

After the capacitor 142 is charged with a voltage which is comparable to the temperature of a hub above a predetermined level, a negative-going output pulse is derived from the voltage signal amplifier 22 which represents the temperature of the web of the wheel being scanned. Such negative-going output pulse is applied over wire 78 and through capacitor 146 to the base of a transistor Q32. The transistor Q32 which is normally fully conducting is cut off according to the base thereof being placed at a negative (—) potential and thus allows the output signal of the voltage signal amplifier 22 representative of web temperatures to be compared to the hub signals stored on capacitor 142. This comparison is made by causing the transistor Q29 to become conductive or to remain non-conductive according to a hub signal being present in its base circuit and the web signals being present in its emitter circuit or absent therefrom according to the levels thereof. A transistor Q30 which is normally cut off becomes conductive according to the cut off condition of a transistor Q31 and the conductive condition of a transistor Q32. Transistor Q31 is cut off in a similar manner to that of transistor Q28 when the positive-going pulse is derived from flip-flop 17 and is cut off for the duration of such pulse. The base of transistor Q30 is then placed at a negative (—) potential to cause conduction thereof, but such negative (—) potential is varied according to the potential drop across resistor 147 and the conduction of transistor Q32. That is, when the negative-going output pulse received over wire 78 is sufficiently negative to cause transistor Q32 to have only limited conduction, the base of transistor Q30 is placed at a more negative (—) potential to cause limited conduction thereof which places the emitter circuit of transistor Q29 at a more negative (—) potential than established by the normal bias condition. The resistors 150 and 151 shown as being variable are employed to respectively bias the emitter circuit of transistor Q29 when no web signals are present and to adjust the magnitude of the web signal applied to such emitter circuit of transistor Q29. Should the signals be such that the output signals of the voltage signal amplifier 22 representative of web temperatures in addition to the normal bias signal condition be at a less negative (—) potential level than the signal stored on capacitor 142, the transistor Q29 then becomes conductive and an output signal taken from its collector circuit, which is produced by a potential drop across resistor 153, is applied to the No. 1 marker pen of the recorder and makes deflection similar to that shown in FIG. 8 for trace D in III. It will be recalled that a marker pen deflection in addition to a deflection by the corresponding analog pen which has an above normal amplitude is indicative of an above normal temperature condition for the corresponding journal. By contrast, when the opposite signal conditions obtain, no output is derived from the collector circuit of transistor Q29 and thus no deflection is made by the marker pen No. 1, this being indicative of a normal temperatured journal or a dragging brake condition according to the amplitude of the corresponding analog pen deflection.

It should be understood that the hub and web signal comparing circuit 29 is comprised of elements similar to those of circuit 23 and is operated in a similar manner thereto. Also, the output derived from circuit 29 should be connected to the marker pen No. 2 of the recorder for providing dragging brake indications for the wheels being scanned by the radiometer RD2.

RECORDER

From the description previously given, it is apparent that each analog pen in the recorder is deflected for each passing wheel, being deflected only a small amount when the wheel hub is at a normal temperature as determined by the pedestal output pulse described above when a low level of wheel hub signal is given by the corresponding radiometer and producing a substantially larger deflection of that pen when a journal is overheated so that the wheel hub output signal of the radiometer is substantially increased in amplitude. For such larger pen deflections, the threshold voltage as determined by the breakdown diode characteristics must have been overcome by the wheel hub output signals of the radiometer. Since a mark is made on the graph of the recorder for each passing wheel, it is apparent that, when an indication is given of an overheated hub condition, it can readily be ascertained which journal on the train is overheated. Thus, the particular pen producing a deflection indicative of an overheated journal indicates on which side of the train the overheated journal occurs and since such a deflection of some kind is recorded for each passing wheel, a count of the total number of deflections immediately indicates which particular journal on that side of the train is overheated.

Each marker pen, however, registers a deflection on the graph of the recorder as long as the hub signal exceeds the normal bias conditions of a transistor in circuits 23 and 29 and the web signals for each wheel, but does not give a deflection thereon where the web signals and/or such normal bias conditions exceeds the hub signal for a wheel. This record is ordinarily made upon the same graph as the marks made by the analog pens and is again an easy matter to detect not only on which side of the train the dragging brake condition exists, but also which axle, the latter information again being obtained by counting the number of deflections produced by the associated analog pen.

The recorder as employed in this embodiment of the present invention includes marker pens which are employed to provide or not provide deflections which are indicative of the brake conditions. As an alternate, it is contemplated that such indications could be superimposed on the respective analog pen driving pulses to produce an opposite deflection following the deflection described above for such analog pens. In employing such opposite deflections of the analog pens, it is contemplated that similar indications are thereby provided for indicating the brake conditions as described above for the marker pens. That is, the presence of an opposite deflection of an analog pen indicates that the journal temperature has not been raised because of rim temperature and thus the analog pen deflection therefore is a true indication of journal temperature, whereas the absence of the opposite pen deflection is an indication that the journal temperature has been raised because of the rim temperature and that a dragging brake condition exists for that wheel.

MODIFICATIONS

It has been described above how the beam of scan for each radiometer RD1 and RD2 is directed at an acute angle in the order of forty-five degrees with the roadbed to include each wheel hub and wheel web and the coupler 7 between successive cars in addition to the undersides of cars to shield the detector cell from solar energy. Referring to FIG. 9, the beam of scan for each of the radiometers RD1 and RD2 as represented by dotted lines 36 is also at an acute angle with the plane of the roadbed, but such acute angle is in the order of sixty-five degrees so as to permit intersection of the underside of successive cars and successive wheels at the lower portion of each hub and the web thereof, but not the coupler 7 between successive cars. In this respect, the detector cells for radiometers RD1 and RD2 are each exposed to solar energy between successive railroad cars and this exposure may be for as long as six seconds without causing permanent damage thereof. The system, however, must recognize the radiometer output as being that provided by exposure to solar energy and then be immediately responsive to other outputs which represent the infrared energy levels of either wheel hubs or wheel webs. This is possible when using the novel pre-amplifier shown diagrammatically in FIG. 10.

With reference to FIG. 10, a detailed circuit illustration is shown therein of a voltage signal pre-amplifier 158 which may be used to amplify the unidirectional output signal of the radiometers RD1 and RD2 in lieu of pre-amplifiers 21 and 27.

The voltage signal pre-amplifier 158 is similar to pre-amplifiers 21 and 27 discussed above in that it is of the differential linear type. The transistors Q1 through Q8 act to amplify the unidirectional outputs supplied from a radiometer by causing the normally partially conducting transistors Q1–Q8 to conduct variably in response thereto. Diode 162 acts to prevent capacitor 160 from being charged negative with respect to ground when power supply connections are made to the circuit. Resistor 154 permits circuit operating adjustments to stabilize the operation of pre-amplifiers 158 when necessary. The amplified output appearing at the point between the collector of transistor Q7 and the top of resistor 63 and being an alternating current voltage is fed back to the base of the transistor Q2 through resistors 64 and 65. In addition, such amplified output is supplied to capacitor 160 through resistors 64 and 161. In this connection, resistors 64 and 161 act as a voltage divider to determine the amount of alternating current voltage applied to the base of transistor Q2 and thus determines the gain of the pre-amplifier. Resistor 161 is made variable to obtain the desired gain. Diode 163 is provided to restore the charge on capacitor 160 to that which will maintain the direct current voltage level of the output at ground potential.

Under normal conditions, the direct current voltage level in the output collector circuit of transistor Q7 is substantially zero with respect to ground. The combination of resistor 161 and capacitor 160 presents a high impedance to direct current feedback through resistor 64 so that substantially all such feedback is applied to the base of transistor Q2 through resistor 65, thus maintaining the output direct current voltage level at substantially ground level. Capacitor 160, however, has its charge changed by any direct current voltage feedback from the output circuit which is applied to the base of transistor Q2. The pre-amplifier then operates to produce at its output a direct current voltage level, in the absence of an output from a radiometer, which attempts to go negative with respect to ground. Diode 163 operates to supply this negative going output voltage to the capacitor 160 which changes the charge thereon very rapidly and restores the pre-amplifier output to a direct current zero level with respect to ground.

*First alternate form*

GENERAL MANNER OF OPERATION

It has been described above how the gating circuits shown in FIGS. 4, 6A and 6B permit the hub signal to be stored while a wheel is traversing the distance between wheel detector WD1 and either wheel detector WD2 or WD3 before a comparison is made of hub and web signals. A first alternate form of this invention employs a gating circuit which allows the hub signal to be stored until such time as a web signal is received, but such web signal is representative of only a portion of the web selected according to the positioning of wheel detector WD2 or WD3 and the timed gating circuit. In describing the general mode of operation of the gating circuit for this alternate form, reference will be made not only to the block diagram of FIG. 11, but also to the detailed circuit of FIGS. 12A and 12B.

The unidirectional signals provided by radiometers RD1 and RD2 are first amplified by respective pre-amplifiers 21 and 27, then further amplified by amplifiers 22 and 28, as mentioned above. Amplified outputs are taken respectively from amplifiers 22 and 28 and applied to hub signal storage circuits 20 and 26 and hub and web signal comparing circuits only as determined by the gating circuits.

Each of the hub signal storage circuits 20 and 26 receives a signal from its respective radiometer RD1 or RD2 through its amplifier 22 or 28 which is stored by a capacitor only for a period of time as determined by the positive-going gating pulse supplied from flip-flop 16. This gating pulse has a duration of three milliseconds which limits the usable radiometer signal to the hub signal obtained nearest the journal. Each of the stored hub signals is then supplied from its storage circuit 20 or 26 to its comparing circuit 23 or 29 for a period of time as determined by the time that it takes a wheel to traverse the distance from wheel detector WD1 to either wheel detector WD2 or WD3 depending upon train direction and for a timed interval thereafter which is in the order of three milliseconds. As long as a wheel is between wheel detector WD1 and proceeding to the wheel detector WD2 or WD3, flip-flop 17 supplies a positive-going output pulse to both storage circuits 20 and 26 through diodes 170 and 171, respectively. When that wheel has passed over wheel detector WD2 or WD3, flip-flop 17 is operated to its normal condition which causes a positive-going output pulse to be supplied to flip-flop 155 for changing it from a normal condition to a different condition for a period of three milliseconds. During this three milliseconds period a positive-going output pulse is supplied to the storage circuits 20 and 26 through diodes 173 and 174. Also, such positive-going output pulse from flip-flop 155 is supplied to comparing circuits 23 and 29 for gating such circuits and allowing the stored hub signals and current web signals received by the radiometers RD1 and RD2 to be compared.

Each of the comparing circuits 23 and 29 supplies a positive-going output signal to a pulse stretching flip-flop only when the hub signal is determined to be greater in amplitude than that of the web signal. The pulse stretching flop-flops 157 and 158 for comparing circuits 23 and 29 respectively lengthen the pulse direction to approximately thirty milliseconds for operating a marker pen, i.e., No. 1 or No. 2 as described above. Analog signals representing stored hub signals are supplied to the analog pens No. 1 and No. 2 as described above.

DESCRIPTION OF DETAILED CIRCUITS

The detailed circuits shown in FIGS. 12A and 12B will presently be described in order that a more complete understanding of the first alternate form of this invention can be obtained. In this connection, the circuits shown in FIGS. 12A and 12B are those which are associated with the radiometer RD1. It should be understood that similar circuits are provided for radiometer RD2, but these will not be described here in detail.

With reference to FIGS. 12A and 12B, the hub signal storage circuit 20 is shown in detail and this circuit is similar to that shown and described above. That is, the hub signal obtained from amplifier 22 is applied to the base of transistor Q21 which is energized for a period of three milliseconds only as permitted by the deenergization of transistor Q20 by the incoming positive-going signal supplied from flip-flop 16. During this time, the hub signal is stored on capacitor 122 as described above. This stored signal is also applied to the base of transistor Q23 to cause this transistor Q23 to conduct only provided the transistor Q22 is deenergized.

A positive-going output signal is supplied from flip-flop 19 to the base of transistor Q22 for a period of thirty milliseconds which causes transistor Q22 to be cut off. This thirty millisecond positive-going signal also is applied to the base of transistor Q24 and cuts it off which permits the stored hub signal to be applied to the base of transistor Q25 which causes it to conduct according to the negative-going potential of the hub signal. A positive-going output signal is taken from the top side of resistor 136 and applied over wire 176 to analog pen No. 1.

As long as transistor Q23 is conducting, a negative-going signal characteristic of the hub signal is supplied to the comparing circuit 23 and more particularly to the base of transistor Q29 and one side of capacitor 142 through a steering diode 178. To insure that transistor Q23 is permitted to conduct until such time as the web is scanned by radiometer RD1, two successively appearing positive-going signals are supplied respectively by flip-flop 17 and flip-flop 155.

As flip-flop 17 is operated according to a wheel passing wheel detector WD1 as described above, a positive-going signal is supplied through steering diode 173 and over wire 179 to the base of transistor Q22. When, however, the wheel passes wheel detector WD2 or WD3 according to train direction, flip-flop 17 is operated to its normal operating condition where a negative-going output pulse is supplied from flip-flop 17, but is blocked by diode 173. Flip-flop 155 is operated from a normal condition to an opposite condition by a positive-going output signal supplied from flip-flop 17 and through capacitor 185 and steering diode 186 which causes the normally energized transistor Q38 to be deenergized and the normally deenergized transistor Q39 to be energized. This condition remains according to the included circuit elements comprising the resistor biasing circuits and capacitor 181 for a period of three milliseconds. During this three milliseconds period, a positive-going output signal is taken from the collector circuit of transistor Q39 and applied through diode 170 and over wire 179 to the base of transistor Q22. Thus, as long as transistor Q22 remains deenergized, a negative-going output signal is taken from the emitter circuit of transistor Q23 and applied to the base of transistor Q29 in comparing circuit 23.

The positive-going output signal taken from the collector of transistor Q39 in flip-flop 155 is also applied over wire 183 to the base circuits of transistors Q28 and Q31 through a capacitor 145 and a resistor 144. Transistors Q28 and Q31 are rendered deenergized for the duration of this positive-going output signal which is in the order of three milliseconds. During this time, the web signal supplied from amplifier 22 and applied to the base of transistor Q32 through a capacitor 146 causes operation of transistor Q32 and transistor Q30 in the manner described above. The hub signal then applied to the base of transistor Q29 and the web signal applied to the emitter of transistor Q29 cause operation thereof in the manner described above to render transistor Q29 conductive only when the hub signal is more negative then the web signal which permits a positive-going signal to be taken from the collector circuit of transistor Q29 and applied over wire 185 to the pulse stretching flip-flop 157. More particularly, flip-flop 157 comprises transistors Q41 and Q42 which are respectively normally energized and deenergized. The positive-going output signal applied to the base of transistor Q41 through capacitor 187 and steering diode 188 causes a reversal of operation for a period of approximately thirty milliseconds as determined by the included resistor biasing circuits and capacitor 190. During such thirty millisecond period, a positive-going output signal is taken from the collector circuit of transistor Q42 and supplied to marker pen No. 1 in the recorder. In the event that the web signal was more negative than the hub signal, then transistor Q29 would remain deenergized which would also cause flip-flop 157 to remain in its normal condition. Marker pen No. 1 would thus remain inoperative.

*Second alternate form*

If it is desired to only utilize the radiometer outputs which are representative of hub signals, a circuit organization such as shown in FIG. 13 may be utilized. Generally speaking the embodiment of FIG. 13 utilizes the three millisecond gating signal from flip-flop 16 to permit passage of pre-amplifier output signals, but to otherwise permit such pre-amplifier signals to be passed to ground.

Referring to FIG. 13, a resistor and transistor are shown to be inserted between the pre-amplifier and amplifier for each of the radiometers RD1 and RD2. For radiometer RD, a resistor 193 is inserted between the output of pre-amplifier 21 and the input of amplifier 22, while the emitter circuit of transistor Q45 is connected between resistor 193 and the input circuit to amplifier 22. For radiometer RD2, a resistor 195 is connected between the output of pre-amplifier 27 and the input to amplifier 28, while the emitter circuit of a transistor Q46 is connected between resistor 195 and the input to amplifier 28. The collector circuit for each of the transistors Q45 and Q46 is connected to ground, whereas the base circuit therefor is connected to the output of flip-flop 16 through the coupling circuit comprised of capacitor 117 and resistor 118.

In operation, each unidirectional signal supplied from radiometer RD1 or RD2 is passed to ground through its respective transistor circuit Q45 or Q46 in that flip-flop 16 normally supplies a negative-going output signal to the base circuits therefor. When flip-flop 161 is operated to its opposite operating condition as determined by a wheel passing wheel detector WD1, a positive-going output signal is supplied to the base of transistor Q45 and Q46 which deenergizes these transistors for the duration of the signal. The pre-amplifier signals are then supplied through respective resistors 193 and 195 to the inputs of respective amplifiers 22 and 28.

The preceding operation described obviously uses only circuits shown in FIGS. 4 and 6A and 6B above which have to do with hub signals. That is, no provision is made here for utilizing the comparing circuits, but it is only required that signals of approximately thirty milliseconds in duration be supplied to the analog pens of the recorder for providing indications of journal temperatures.

SUMMARY

From the foregoing description, it is apparent that in the system of the present invention provision is made for the consideration of the outside influence that the temperatures of a rim for a wheel has on the hub temperature thereof and thus the journal. This outside influence is taken into account by comparing the radiometer outputs for the hub of a wheel and the web thereof to determine if the rim temperatures are responsible in any way for the increased hub temperature.

In order that the output signals from the radiometer may be effectively employed for each wheel, a novel gating organization is provided which is dependent upon a wheel being in the presence of and traversing a plurality of wheel detector elements. Gating voltages are thus produced and employed with the circuits to effect the comparison of hub and web signal outputs representative of respective temperatures with appropriate graphic indications being given of the temperature conditions.

In regard to hub and web signal comparison, two forms are shown and described herein. The first form employs a novel gating organization for limiting the usable hub signals to a time interval of three milliseconds, while limiting the usable web signals according to the spaced positioning of wheel detector elements. The second form employs a novel gating organization for limiting the usable hub signals to a time interval of three milliseconds, while limiting the usable web signals to a similar time interval of three milliseconds, each as determined by the passage of a wheel adjacent a positioned wheel detector. A third form places a gating circuit in the circuit in the amplification circuit to limit the amplified hub signal to substantially three milliseconds.

Provision of a novel pre-amplifier including a distinct feedback and reference level control circuit permits directing the beam of scan at an angle in the order of sixty-five degrees which exposes the detector cell to a solar energy between passing cars, but permits the circuit organization to provide accurate temperature indications immediately thereafter.

In the embodiments of the present invention, it will be noted that two types of transistors are employed throughout. These are normally known as N-P-N and P-N-P type transistors. It should be understood that other types of transistors as well as other electronic components may be employed to accomplish the results as described above for the present embodiment of this invention.

Having described a system for detecting hot elements on railway vehicles as one specific embodiment of this invention, we desire it to be understood that the various forms shown have been selected particularly to facilitate in the disclosure of this invention and not to limit the number of forms that it may assume. We desire it to also be understood that various other modifications, adaptations and alterations may be made to the specific form shown to meet the requirements of practice without in any manner departing from the spirit or scope of this invention.

What we claim is:

1. In a system for detecting overheated elements on railway vehicles moving along a stretch of track comprising, at least one radiometer positioned along a respective track rail and including a detector element being distinctively controlled by infrared radiation emanating from a source included within a defined beam of scan of said radiometer, said detector element providing a distinctive output having at least one characteristic dependent upon the level of infrared radiation impinging upon said detector element, said radiometer being positioned to cause said beam of scan to be generally traverse to the plane of each passing wheel and to include the hub and the web of each wheel, gating means being controlled by the position of each wheel for producing a first gating output having a predetermined duration of time exclusive of any further positioning of each wheel demarcating the time within which said beam of scan includes a portion of said wheel hub, said gating means being further controlled by the position of each wheel for producing a second gating output demarcating an interval encompassing the time within which said beam of scan includes a portion of said wheel web, hub signal storage means being controlled jointly by said radiometer output and said first gating output for providing a distinctive indication of wheel hub temperature, and hub and web signal comparing means being distinctly controlled by said radiometer output, said hub signal storage means and said second gating output acting to provide a distinctive indication of wheel web temperature with respect to wheel hub temperature and thereby determine which of the two temperatures is higher.

2. The system according to claim 1 wherein said radiometer and detector element is constructed and arranged to direct said beam of scan upwardly at an angle of approximately sixty-five degrees with respect to the rails of said track to include the hub and web of each passing wheel along a line paralleling the rails of said track.

3. The system defined in claim 1 wherein said gating means includes a plurality of wheel detector elements positioned at respective fixed locations along at least one of said track rails with respect to said radiometer, each of said wheel detector elements being responsive to the passage of each wheel past its respective location to produce a distinctive output, said gating means also including a plurality of gate generating means controlled by the distinctive outputs produced by one wheel detector element which is centrally located with respect to the other wheel detector elements and substantially in line with said radiometer for producing said first and second gating outputs, said first gating output being terminated by one of said gate generating means after a predetermined time and independent of further wheel positioning, said second gating output being terminated by the other of said gate generating means according to additional control thereof by distinctive outputs from either of the other wheel detector elements.

4. A system for detecting overheated elements on railway vehicles moving along a stretch of track comprising, in combination, detector means positioned along said track adapted to respond to infrared radiation emanating from elements in the presence thereof, gating means controlled by the position of each passing wheel for producing a first gating output of a predetermined duration of time irrespective of car speed for demarcating the time within which said detector means is responsive to infrared radiation received from one particular element of a wheel, said gating means being additionally controlled by the position of each wheel for producing a second gating output of a predetermined duration of time within which said detector means is responsive to infrared radiation received from another element of said wheel, means for comparing outputs from said detector means adapted to provide distinctive outputs according to the presence of said first and second gating outputs, and output means responsive to said distinctive outputs for providing indications of the temperature conditions of said elements.

5. The system defined in claim 4 wherein the two elements are the hub and web of a passing wheel.

6. The system according to claim 4 wherein said gating circuit means includes a plurality of wheel detector elements positioned at respective fixed locations along at least one rail of said stretch of track with respect to said detector means, each of said plurality of wheel detector elements being controlled by the passage of each wheel thereby to produce a distinctive output, said gating circuit means also including a plurality of gate generating means controlled by the distinctive outputs produced by at least two of said wheel detector elements for producing a first gated output and a second gated output, said first gated output being terminated by one of said gate generating means after a predetermined time interval and independent of further wheel positioning for demarcating one of said two selected time intervals, said gated outputs being terminated by a second of said gate generating means after a predetermined time interval and independent of further wheel positioning for demarcating the second of said two selected time intervals.

7. The system according to claim 4 wherein said means for comparing output signals includes means for storing the output signals supplied from said detector means during said one selected time interval, whereby the signals characteristic of one distinct element of a passing wheel are stored, said means for comparing output signals being controlled by said stored signals and incoming signals from said detector means characteristic of infrared radiation from a second distinct element of a passing wheel according to the duration of said second selected time interval as limited by said second gate generating means, said comparing means being operative to provide a distinctive output only when the signals characteristic of said one distinct element exceeds the signals characteristic of said second distinct element.

8. In a system for detecting overheated elements on railway vehicles moving along a stretch of track comprising, detector means positioned along said track adapted to respond to infrared radiation emanating from elements and to provide direct current voltage output signals which vary in magnitude according to the temperatures of the elements scanned, direct current amplifier means responsive to the variations in magnitude of said detector outputs for providing an amplified direct current output thereof, said amplifier means including a feedback circuit from said amplified output for insuring that the amplified output is representative of the direct current detector output, gating means controlled by the position of each passing wheel for demarcating an interval during which said detector means is responsive to infrared energy emanating from a particular element, and output means controlled by said gating output and said amplified output for registering distinctive indications of temperature conditions of said elements.

9. The system defined in claim 8 wherein said amplifier means includes a pre-amplifier circuit having a plurality of transistors, certain of said plurality of transistors being directly responsive to said detector outputs for causing the amplification thereof and at least one of the remaining transistors thereof being directly responsive to the character of the amplified output for controlling the total gain and linearity of said amplifier means and causing said amplified output to be representative of the output from said detector means.

10. A system for detecting the presence of an overheated journal associated with a wheel of a railway car upon passage of the car along a stretch of track comprising,
 (a) detector means disposed along said stretch of railway track for providing a direct current output signal in response to a hot element associated with said journal when the wheel passes the detector, the amplitude of the output signal being indicative of the degree of heat of said element,
 (b) said detector means at other times providing a relatively large output signal when the detector means is exposed to other hot elements,
 (c) a direct current amplifier having its input controlled in accordance with said output signal and normally operating at a level to have its output close to ground potential except when a signal of a hot element is received by said detector means,
 (d) said direct current amplifier also having its input controlled by a feedback circuit energized by the output from the amplifier having both direct current and alternating current components,
 (e) said feedback circuit including a capacitor for grounding a substantial portion of said alternating current component, and
 (f) said feedback circuit having a unidirectional device for discharging said capacitor in case the operating level of said amplifier shifts below ground potential following amplification of an exceptionally high output signal of said detector, and
 (g) hot journal indicating means controlled by the output of said amplifier for registering the presence of a hot journal.

11. The invention according to claim 10 wherein said unidirectional device is a diode and the diode is effective in the feedback circuit to quickly discharge said capacitor in response to a reversal in the polarity of said feedback circuit relative to ground potential.

12. The invention according to claim 11 wherein the diode connects the capacitor directly to the output of the amplifier upon a reversal in the polarity of the output of the amplifier relative to ground potential.

13. A system for detecting hot elements on railway vehicles passing along a stretch of track comprising, radiometer detector means positioned along said track responsive to infrared radiation emanating from the hub and web of wheels coming in the presence thereof for generating respective direct current outputs, direct current amplifier means being controlled by said direct current outputs and having a feedback circuit from its own output for both direct current and alternating current components for regulating said amplifier to produce controlling output signals closely proportional to the output signals of the radiometer detector means, gating circuit means controlled by the positions of each passing wheel for demarcating at least two selected time intervals each of predetermined limited duration for each wheel thereof during which said radiometer detector means is responsive respectively to infrared energy emanating from the hub and web from each such passing wheel, means controlled by said gating circuit means for comparing said two output signals from said amplifier means for said two time intervals for each wheel to provide distinctive outputs representative of the comparison, and output means responsive to said distinctive outputs for providing indications of the temperature conditions of said elements.

14. The system defined in claim 13 wherein the gating means includes at least one wheel responsive detector for initiating two separate predetermined times of limited duration for detecting the amount of radiation received from the hub and web of each passing wheel.

15. The system as defined in claim 13 wherein the gating means includes at least two wheel responsive detectors appropriately spaced for respectively initiating two separate predetermined times of limited duration for detecting the amount of radiation received from the hub and web respectively of each passing wheel.

16. A system for detecting the presence of an overheated journal bearing associated with a wheel of a railway car upon passage of the car along a stretch of railway track comprising,
    (a) a wheel detector disposed at a point in said stretch of track for detecting the passage of the car wheel at the associated location,
    (b) radiometer detector means disposed substantially opposite said point outside the rails of said stretch of track and having an infrared responsive element for generating a signal proportional to infrared radiation impinging upon said element,
    (c) said radiometer detector means having a lens system for rendering said element responsive to infrared radiation only along a beam substantially normal to the stretch of track and directed upwardly at an angle of approximately 65° to include at least a portion of the outer hub of the wheel,
    (d) an amplifier controlled in accordance with the amplitude of said signal for producing an output signal characteristic of the infrared radiation impinging upon said element,
    (e) time gating means controlled by said wheel detector, said time gating means including a solid state electronic switch being turned on in response to the detection of a wheel by said wheel detector and being turned off thereafter at the end of a fixed time interval in the order of three milliseconds,
    (f) signal storing means controlled in response to the output signal of said amplifier only while said time gating means is turned on for storing a signal indicating the extent of infrared radiation impinging upon said infrared responsive element during said fixed time interval,
    (g) pulse stretching means controlled by said gating means to be turned on in response to the turning on of said solid state switch, and remaining turned on for a period of time substantially greater than the time during which said solid state switch is turned on, said pulse stretching means acting to maintain said signal storage means effective to store a signal for said greater time,
    (h) and recording means controlled by said signal stored in said signal storing means throughout the time measured by said pulse stretching means for indicating the extent of infrared radiation impinging upon said infrared responsive element.

References Cited by the Examiner

UNITED STATES PATENTS

| | | | |
|---|---|---|---|
| 2,089,835 | 8/1937 | Logan | 246—29 |
| 2,233,788 | 3/1941 | Lewin | 73—355 X |
| 2,856,539 | 10/1958 | Orthuber et al. | 246—169 |
| 2,947,857 | 8/1960 | Gallagher et al. | 246—169 |
| 2,963,575 | 12/1960 | Pelino et al. | 246—169 |
| 3,076,090 | 1/1963 | Stapelfeldt | 246—169 |
| 3,094,675 | 6/1963 | Ule | 330—110 |
| 3,095,171 | 6/1963 | Gallagher et al. | 246—169 |
| 3,119,017 | 1/1964 | Kaehms | 250—83.3 X |
| 3,139,590 | 6/1964 | Brown | 330—9 |
| 3,143,650 | 8/1964 | Mizen | 250—83.3 X |
| 3,183,350 | 5/1965 | Sibley | 246—169 |

FOREIGN PATENTS 836,721  6/1960  Great Britain.

EUGENE G. BOTZ, *Primary Examiner.*